United States Patent
Hull et al.

(10) Patent No.: US 7,747,655 B2
(45) Date of Patent: Jun. 29, 2010

(54) PRINTABLE REPRESENTATIONS FOR TIME-BASED MEDIA

(75) Inventors: Jonathan J. Hull, San Carlos, CA (US);
Jamey Graham, San Jose, CA (US);
Peter E. Hart, Menlo Park, CA (US)

(73) Assignee: Ricoh Co. Ltd., Tokyo (JP)

( * ) Notice: Subject to any disclaimer, the term of this patent is extended or adjusted under 35 U.S.C. 154(b) by 540 days.

(21) Appl. No.: 10/814,844

(22) Filed: Mar. 30, 2004

(65) Prior Publication Data

US 2005/0010409 A1    Jan. 13, 2005

Related U.S. Application Data

(60) Provisional application No. 60/506,303, filed on Sep. 25, 2003, provisional application No. 60/506,411, filed on Sep. 25, 2003, provisional application No. 60/506,263, filed on Sep. 25, 2003.

(51) Int. Cl.
*G06F 7/00* (2006.01)
*G06F 17/00* (2006.01)

(52) U.S. Cl. .................. 707/802; 715/201; 715/204; 715/209; 715/210

(58) Field of Classification Search .................. 707/100; 715/500.1, 100, 201, 204, 209, 210; 704/221, 704/243, 245
See application file for complete search history.

(56) References Cited

U.S. PATENT DOCUMENTS

| | | | |
|---|---|---|---|
| 4,133,007 | A | 1/1979 | Wessler et al. |
| 4,205,780 | A | 6/1980 | Burns et al. |
| 4,417,239 | A | 11/1983 | Demke et al. |
| 4,437,378 | A | 3/1984 | Ishida et al. |

(Continued)

FOREIGN PATENT DOCUMENTS

CA    2386829    11/2002

(Continued)

OTHER PUBLICATIONS

Dimitrova, Nevenka, et al., "Applications of Video-Content Analysis and Retrieval", IEEE Multimedia, Jul.-Sep. 2002, pp. 42-55.*

(Continued)

*Primary Examiner*—Robert Stevens
(74) *Attorney, Agent, or Firm*—Fenwick & West LLP

(57) ABSTRACT

The system of the present invention allows a user to generate a representation of time-based media. The system of the present invention includes a feature extraction module for extracting features from media content. For example, the feature extraction module can detect solos in a musical performance, or can detect music, applause, speech, and the like. A formatting module formats a media representation generated by the system. The formatting module also applies feature extraction information to the representation, and formats the representation according to a representation specification. In addition, the system can include an augmented output device that generates a media representation based on the feature extraction information and the representation specification. The methods of the present invention include extracting features from media content, and formatting a media representation being generated using the extracted features and based on a specification or data structure specifying the representation format. The methods can also include generating a media representation based on the results of the formatting.

35 Claims, 12 Drawing Sheets

U.S. PATENT DOCUMENTS

| | | | |
|---|---|---|---|
| 4,481,412 A | 11/1984 | Fields | |
| 4,619,522 A | 10/1986 | Imai | |
| 4,635,132 A | 1/1987 | Nakamura | |
| 4,703,366 A | 10/1987 | Kobori et al. | |
| 4,734,898 A | 3/1988 | Morinaga | |
| 4,754,485 A | 6/1988 | Klatt | |
| 4,807,186 A | 2/1989 | Ohnishi et al. | |
| 4,823,303 A | 4/1989 | Terasawa | |
| 4,831,610 A * | 5/1989 | Hoda et al. | 369/47.23 |
| 4,881,135 A | 11/1989 | Heilweil | |
| 4,907,973 A | 3/1990 | Hon | |
| 4,987,447 A | 1/1991 | Ojha | |
| 4,998,215 A * | 3/1991 | Black et al. | 358/1.6 |
| 5,010,498 A | 4/1991 | Miyata | |
| 5,059,126 A | 10/1991 | Kimball | |
| 5,060,135 A | 10/1991 | Levine et al. | |
| 5,091,948 A | 2/1992 | Kametani | |
| 5,093,730 A | 3/1992 | Ishii et al. | |
| 5,111,285 A | 5/1992 | Fujita et al. | |
| 5,115,967 A | 5/1992 | Wedekind | |
| 5,136,563 A | 8/1992 | Takemasa et al. | |
| 5,153,831 A | 10/1992 | Yianilos | |
| 5,161,037 A | 11/1992 | Saito | |
| 5,168,371 A | 12/1992 | Takayanagi | |
| 5,170,935 A | 12/1992 | Federspiel et al. | |
| 5,220,649 A | 6/1993 | Forcier | |
| 5,225,900 A | 7/1993 | Wright | |
| 5,231,698 A | 7/1993 | Forcier | |
| 5,237,648 A | 8/1993 | Mills et al. | |
| 5,243,381 A | 9/1993 | Hube | |
| 5,250,787 A | 10/1993 | Arii et al. | |
| 5,255,389 A | 10/1993 | Wang | |
| 5,258,880 A | 11/1993 | Takahashi | |
| 5,267,303 A | 11/1993 | Johnson et al. | |
| 5,270,989 A | 12/1993 | Kimura | |
| 5,280,609 A | 1/1994 | MacPhail | |
| 5,299,123 A | 3/1994 | Wang et al. | |
| 5,309,359 A | 5/1994 | Katz et al. | |
| 5,343,251 A | 8/1994 | Nafeh | |
| 5,349,658 A | 9/1994 | O'Rourke et al. | |
| 5,369,508 A | 11/1994 | Lech et al. | |
| 5,382,776 A | 1/1995 | Arii et al. | |
| 5,384,703 A | 1/1995 | Withgott et al. | |
| 5,386,510 A | 1/1995 | Jacobs | |
| 5,404,295 A | 4/1995 | Katz et al. | |
| 5,418,948 A | 5/1995 | Turtle | |
| 5,428,555 A | 6/1995 | Starkey et al. | |
| 5,432,532 A * | 7/1995 | Mochimaru et al. | 347/176 |
| 5,436,792 A | 7/1995 | Leman et al. | |
| 5,438,426 A | 8/1995 | Miake et al. | |
| 5,442,795 A | 8/1995 | Levine et al. | |
| 5,444,476 A | 8/1995 | Conway | |
| 5,448,375 A | 9/1995 | Cooper et al. | |
| 5,459,307 A | 10/1995 | Klotz, Jr. | |
| 5,467,288 A | 11/1995 | Fasciano et al. | |
| 5,468,371 A | 11/1995 | Nelson et al. | |
| 5,479,600 A | 12/1995 | Wroblewski et al. | |
| 5,480,306 A | 1/1996 | Liu | |
| 5,481,666 A | 1/1996 | Nguyen et al. | |
| 5,485,554 A * | 1/1996 | Lowitz et al. | 358/1.17 |
| 5,493,409 A | 2/1996 | Maeda et al. | |
| 5,499,108 A | 3/1996 | Cotte et al. | |
| 5,524,085 A | 6/1996 | Bellucco et al. | |
| 5,566,271 A | 10/1996 | Tomitsuka et al. | |
| 5,568,406 A | 10/1996 | Gerber | |
| 5,572,651 A | 11/1996 | Weber et al. | |
| 5,576,950 A | 11/1996 | Tonomura et al. | |
| 5,581,366 A | 12/1996 | Merchant et al. | |
| 5,581,682 A | 12/1996 | Anderson et al. | |
| 5,590,257 A | 12/1996 | Forcier | |
| 5,596,698 A | 1/1997 | Morgan | |
| 5,596,700 A | 1/1997 | Darnell et al. | |
| 5,600,775 A | 2/1997 | King et al. | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A | 5/1997 | Sugiyama et al. | |
| 5,638,543 A | 6/1997 | Pedersen et al. | |
| 5,640,193 A | 6/1997 | Wellner | |
| 5,661,506 A | 8/1997 | Lazzouni et al. | |
| 5,661,783 A | 8/1997 | Assis | |
| 5,675,752 A | 10/1997 | Scott et al. | |
| 5,680,223 A | 10/1997 | Cooper et al. | |
| 5,680,636 A | 10/1997 | Levine et al. | |
| 5,682,330 A | 10/1997 | Seaman et al. | |
| 5,682,540 A * | 10/1997 | Klotz et al. | 715/209 |
| 5,686,957 A | 11/1997 | Baker | |
| 5,690,496 A * | 11/1997 | Kennedy | 434/307 R |
| 5,694,559 A | 12/1997 | Hobson et al. | |
| 5,706,097 A | 1/1998 | Schelling et al. | |
| 5,710,874 A | 1/1998 | Bergen | |
| 5,715,381 A | 2/1998 | Hamilton | |
| 5,717,841 A | 2/1998 | Farrell et al. | |
| 5,717,879 A | 2/1998 | Moran et al. | |
| 5,721,883 A | 2/1998 | Katsuo et al. | |
| 5,721,897 A | 2/1998 | Rubinstein | |
| 5,729,665 A | 3/1998 | Gauthier | |
| 5,734,752 A | 3/1998 | Knox | |
| 5,734,753 A | 3/1998 | Bunce | |
| 5,737,599 A | 4/1998 | Rowe et al. | |
| 5,745,756 A | 4/1998 | Henley | |
| 5,748,805 A | 5/1998 | Withgott et al. | |
| 5,749,735 A | 5/1998 | Redford et al. | |
| 5,751,283 A | 5/1998 | Smith | |
| 5,754,308 A | 5/1998 | Lopresti et al. | |
| 5,754,939 A | 5/1998 | Herz et al. | |
| 5,757,897 A | 5/1998 | LaBarbera et al. | |
| 5,758,037 A | 5/1998 | Schroeder | |
| 5,760,767 A | 6/1998 | Shore et al. | |
| 5,761,380 A | 6/1998 | Lewis et al. | |
| 5,761,655 A | 6/1998 | Hoffman | |
| 5,761,686 A | 6/1998 | Bloomberg | |
| 5,764,368 A | 6/1998 | Shibaki et al. | |
| 5,765,176 A | 6/1998 | Bloomberg | |
| 5,774,260 A | 6/1998 | Petitto et al. | |
| 5,778,397 A | 7/1998 | Kupiec et al. | |
| 5,781,785 A | 7/1998 | Rowe et al. | |
| 5,784,616 A | 7/1998 | Horvitz | |
| 5,790,114 A | 8/1998 | Geaghan et al. | |
| 5,793,365 A | 8/1998 | Tang et al. | |
| 5,793,869 A | 8/1998 | Claflin, Jr. | |
| 5,802,294 A | 9/1998 | Ludwig et al. | |
| 5,804,803 A | 9/1998 | Cragun et al. | |
| 5,809,318 A | 9/1998 | Rivette et al. | |
| 5,812,664 A | 9/1998 | Bernobich et al. | |
| 5,819,301 A | 10/1998 | Rowe et al. | |
| 5,832,474 A | 11/1998 | Lopresti et al. | |
| 5,838,317 A | 11/1998 | Bolnick et al. | |
| 5,845,144 A | 12/1998 | Tateyama et al. | |
| 5,857,185 A | 1/1999 | Yamaura | |
| 5,860,074 A | 1/1999 | Rowe et al. | |
| 5,869,819 A | 2/1999 | Knowles et al. | |
| 5,870,552 A | 2/1999 | Dozier et al. | |
| 5,870,770 A | 2/1999 | Wolfe | |
| 5,873,107 A | 2/1999 | Borovoy et al. | |
| 5,877,764 A | 3/1999 | Feitelson et al. | |
| 5,884,056 A | 3/1999 | Steele | |
| 5,892,536 A | 4/1999 | Logan et al. | |
| 5,894,333 A | 4/1999 | Kanda et al. | |
| 5,895,476 A | 4/1999 | Orr et al. | |
| 5,898,166 A | 4/1999 | Fukuda et al. | |
| 5,898,709 A | 4/1999 | Imade et al. | |
| 5,903,538 A | 5/1999 | Fujita et al. | |

| Patent No. | Date | Inventor(s) | | Patent No. | Date | Inventor(s) |
|---|---|---|---|---|---|---|
| 5,933,829 A | 8/1999 | Durst et al. | | 6,296,693 B1 | 10/2001 | McCarthy |
| 5,933,841 A | 8/1999 | Schumacher et al. | | 6,297,812 B1 | 10/2001 | Ohara et al. |
| 5,936,542 A | 8/1999 | Kleinrock et al. | | 6,297,851 B1 | 10/2001 | Taubman et al. |
| 5,938,727 A | 8/1999 | Ikeda | | 6,298,145 B1 * | 10/2001 | Zhang et al. ............... 382/103 |
| 5,939,699 A | 8/1999 | Perttunen et al. | | 6,301,586 B1 | 10/2001 | Yang et al. |
| 5,940,776 A | 8/1999 | Baron et al. | | 6,301,660 B1 | 10/2001 | Benson |
| 5,941,936 A | 8/1999 | Taylor | | 6,302,527 B1 | 10/2001 | Walker |
| 5,943,679 A | 8/1999 | Niles et al. | | 6,307,956 B1 | 10/2001 | Black |
| 5,945,998 A | 8/1999 | Eick | | 6,308,887 B1 | 10/2001 | Korman et al. |
| 5,946,678 A | 8/1999 | Aalbersberg | | 6,330,976 B1 | 12/2001 | Dymetman et al. |
| 5,949,879 A | 9/1999 | Berson et al. | | 6,332,147 B1 | 12/2001 | Moran et al. |
| 5,950,187 A | 9/1999 | Tsuda | | 6,340,971 B1 | 1/2002 | Janse et al. |
| 5,962,839 A | 10/1999 | Eskildsen | | 6,360,057 B1 | 3/2002 | Tsumagari et al. |
| 5,974,189 A | 10/1999 | Nicponski | | 6,369,811 B1 * | 4/2002 | Graham et al. ............... 715/764 |
| 5,978,477 A | 11/1999 | Hull et al. | | 6,373,498 B1 | 4/2002 | Abgrall |
| 5,978,773 A | 11/1999 | Hudetz et al. | | 6,373,585 B1 | 4/2002 | Mastie et al. |
| 5,982,507 A | 11/1999 | Weiser et al. | | 6,375,298 B2 | 4/2002 | Purcell et al. |
| 5,986,655 A | 11/1999 | Chiu et al. | | 6,378,070 B1 | 4/2002 | Chan et al. |
| 5,986,692 A | 11/1999 | Logan et al. | | 6,381,614 B1 * | 4/2002 | Barnett et al. ............ 707/104.1 |
| 5,987,226 A | 11/1999 | Ishikawa et al. | | 6,396,594 B1 | 5/2002 | French et al. |
| 5,987,454 A | 11/1999 | Hobbs | | 6,400,996 B1 | 6/2002 | Hoffberg et al. |
| 5,990,934 A | 11/1999 | Nalwa | | 6,409,401 B1 | 6/2002 | Petteruti et al. |
| 5,999,173 A | 12/1999 | Ubillos | | 6,417,435 B2 | 7/2002 | Chantzis et al. |
| 6,000,030 A | 12/1999 | Steinberg et al. | | 6,421,067 B1 | 7/2002 | Kamen et al. |
| 6,005,562 A | 12/1999 | Shiga et al. | | 6,421,738 B1 | 7/2002 | Ratan et al. |
| 6,006,218 A | 12/1999 | Breese et al. | | 6,430,554 B1 | 8/2002 | Rothschild |
| 6,006,241 A | 12/1999 | Purnaveja et al. | | 6,434,561 B1 | 8/2002 | Durst, Jr. et al. |
| 6,009,442 A | 12/1999 | Chen et al. | | 6,439,465 B1 | 8/2002 | Bloomberg |
| 6,020,916 A | 2/2000 | Gerszberg et al. | | 6,442,336 B1 | 8/2002 | Lemelson |
| 6,021,403 A | 2/2000 | Horvitz et al. | | 6,452,615 B1 | 9/2002 | Chiu et al. |
| 6,026,409 A | 2/2000 | Blumenthal | | 6,466,329 B1 | 10/2002 | Mukai |
| 6,028,601 A | 2/2000 | Machiraju et al. | | 6,466,534 B2 | 10/2002 | Cundiff, Sr. |
| 6,038,567 A | 3/2000 | Young | | 6,476,793 B1 | 11/2002 | Motoyama et al. |
| 6,043,904 A | 3/2000 | Nickerson | | 6,476,834 B1 | 11/2002 | Doval et al. |
| 6,046,718 A | 4/2000 | Suzuki et al. | | 6,502,114 B1 | 12/2002 | Forcier |
| 6,055,542 A | 4/2000 | Nielsen et al. | | D468,277 S | 1/2003 | Sugiyama |
| 6,061,758 A | 5/2000 | Reber et al. | | 6,502,756 B1 | 1/2003 | Fåhraeus |
| 6,076,733 A | 6/2000 | Wilz, Sr. et al. | | 6,504,620 B1 | 1/2003 | Kinjo |
| 6,076,734 A | 6/2000 | Dougherty et al. | | 6,505,153 B1 | 1/2003 | Van Thong et al. |
| 6,081,261 A | 6/2000 | Wolff et al. | | 6,515,756 B1 | 2/2003 | Mastie et al. |
| 6,094,648 A | 7/2000 | Aalbersberg | | 6,518,986 B1 | 2/2003 | Mugura |
| RE36,801 E | 8/2000 | Logan et al. | | 6,519,360 B1 * | 2/2003 | Tanaka ..................... 382/162 |
| 6,098,082 A | 8/2000 | Gibbon et al. | | 6,529,920 B1 | 3/2003 | Arons et al. |
| 6,098,106 A * | 8/2000 | Philyaw et al. ............... 709/238 | | 6,535,639 B1 * | 3/2003 | Uchihachi et al. ............ 382/225 |
| 6,101,503 A | 8/2000 | Cooper et al. | | 6,542,933 B1 | 4/2003 | Durst, Jr. et al. |
| 6,106,457 A | 8/2000 | Perkins et al. | | 6,544,294 B1 | 4/2003 | Greenfield et al. |
| 6,108,656 A | 8/2000 | Durst et al. | | 6,546,385 B1 | 4/2003 | Mao et al. |
| 6,111,567 A | 8/2000 | Savchenko et al. | | 6,552,743 B1 | 4/2003 | Rissman |
| 6,115,718 A | 9/2000 | Huberman et al. | | 6,556,241 B1 | 4/2003 | Yoshimura et al. |
| 6,118,888 A | 9/2000 | Chino et al. | | 6,567,980 B1 | 5/2003 | Jain et al. |
| 6,123,258 A | 9/2000 | Iida | | 6,568,595 B1 | 5/2003 | Russell et al. |
| 6,125,229 A | 9/2000 | Dimitrova et al. | | 6,581,070 B1 | 6/2003 | Gibbon et al. |
| 6,138,151 A | 10/2000 | Reber et al. | | 6,587,859 B2 | 7/2003 | Dougherty et al. |
| 6,141,001 A | 10/2000 | Baleh | | 6,593,860 B2 | 7/2003 | Lai et al. |
| 6,148,094 A | 11/2000 | Kinsella | | 6,594,377 B1 | 7/2003 | Kim et al. |
| 6,151,059 A | 11/2000 | Schein et al. | | 6,596,031 B1 | 7/2003 | Parks |
| 6,152,369 A | 11/2000 | Wilz, Sr. et al. | | 6,608,563 B2 | 8/2003 | Weston et al. |
| 6,153,667 A | 11/2000 | Howald | | 6,611,276 B1 | 8/2003 | Muratori et al. |
| 6,160,633 A | 12/2000 | Mori | | 6,611,622 B1 | 8/2003 | Krumm |
| 6,167,033 A | 12/2000 | Chang et al. | | 6,611,628 B1 * | 8/2003 | Sekiguchi et al. ............ 382/243 |
| 6,170,007 B1 | 1/2001 | Venkatraman et al. | | 6,623,528 B1 | 9/2003 | Squilla et al. |
| 6,175,489 B1 | 1/2001 | Markow et al. | | 6,625,334 B1 | 9/2003 | Shiota et al. |
| 6,182,090 B1 | 1/2001 | Peairs | | 6,636,869 B1 | 10/2003 | Reber et al. |
| 6,189,009 B1 | 2/2001 | Stratigos et al. | | 6,647,534 B1 | 11/2003 | Graham |
| 6,193,658 B1 | 2/2001 | Wendelken et al. | | 6,647,535 B1 | 11/2003 | Bozdagi et al. |
| 6,195,068 B1 | 2/2001 | Suzuki et al. | | 6,651,053 B1 | 11/2003 | Rothschild |
| 6,199,042 B1 | 3/2001 | Kurzweil | | 6,654,887 B2 | 11/2003 | Rhoads |
| 6,199,048 B1 | 3/2001 | Hudetz et al. | | 6,665,092 B2 | 12/2003 | Reed |
| 6,211,869 B1 | 4/2001 | Loveman et al. | | 6,674,538 B2 | 1/2004 | Takahashi |
| 6,222,532 B1 | 4/2001 | Ceccarelli | | 6,675,165 B1 | 1/2004 | Rothschild |
| 6,256,638 B1 | 7/2001 | Dougherty et al. | | 6,678,389 B1 | 1/2004 | Sun et al. |
| 6,262,724 B1 | 7/2001 | Crow et al. | | 6,684,368 B1 | 1/2004 | Hull et al. |
| 6,266,053 B1 * | 7/2001 | French et al. ............... 715/255 | | 6,687,383 B1 * | 2/2004 | Kanevsky et al. ............ 382/100 |

| | | |
|---|---|---|
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 * | 6/2004 | Philyaw et al. ............... 709/217 |
| 6,750,978 B1 | 6/2004 | Marggraff et al. |
| 6,752,317 B2 | 6/2004 | Dymetman et al. |
| 6,753,883 B2 | 6/2004 | Schena et al. |
| 6,760,541 B1 | 7/2004 | Ohba |
| 6,766,363 B1 | 7/2004 | Rothschild |
| 6,771,283 B2 | 8/2004 | Carro |
| 6,772,947 B2 | 8/2004 | Shaw |
| 6,774,951 B2 | 8/2004 | Narushima |
| 6,775,651 B1 * | 8/2004 | Lewis et al. ............... 704/235 |
| 6,781,609 B1 | 8/2004 | Barker et al. |
| 6,807,303 B1 * | 10/2004 | Kim et al. ............... 382/203 |
| 6,824,044 B1 * | 11/2004 | Lapstun et al. ............... 235/375 |
| 6,845,913 B2 | 1/2005 | Madding et al. |
| 6,853,980 B1 | 2/2005 | Ying et al. |
| 6,856,415 B1 | 2/2005 | Simchik et al. |
| 6,865,608 B2 | 3/2005 | Hunter |
| 6,865,714 B1 | 3/2005 | Liu et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 * | 5/2005 | Bolle et al. ............... 706/20 |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 6,993,573 B2 | 1/2006 | Hunter |
| 7,000,193 B1 | 2/2006 | Impink, Jr. et al. |
| 7,023,459 B2 | 4/2006 | Arndt et al. |
| 7,031,965 B1 * | 4/2006 | Moriya et al. ............... 707/10 |
| 7,073,119 B2 | 7/2006 | Matsubayashi et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 | 10/2006 | Lapstun et al. |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,228,492 B1 | 6/2007 | Graham |
| 7,260,828 B2 | 8/2007 | Aratani et al. |
| 7,263,659 B2 * | 8/2007 | Hull et al. ............... 715/716 |
| 7,263,671 B2 | 8/2007 | Hull et al. |
| 7,266,782 B2 | 9/2007 | Hull et al. |
| 7,280,738 B2 | 10/2007 | Kauffman et al. |
| 7,298,512 B2 | 11/2007 | Reese et al. |
| 7,305,620 B1 | 12/2007 | Nakajima et al. |
| 7,313,808 B1 | 12/2007 | Gupta et al. |
| 7,363,580 B2 | 4/2008 | Tabata et al. |
| 7,647,555 B1 * | 1/2010 | Wilcox et al. ............... 715/721 |
| 2001/0003846 A1 | 6/2001 | Rowe et al. |
| 2001/0005203 A1 | 6/2001 | Wiernik |
| 2001/0013041 A1 | 8/2001 | Macleod Beck et al. |
| 2001/0017714 A1 | 8/2001 | Komatsu et al. |
| 2001/0037408 A1 | 11/2001 | Thrift et al. |
| 2001/0043789 A1 | 11/2001 | Nishimura et al. |
| 2001/0044810 A1 | 11/2001 | Timmons |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0023957 A1 | 2/2002 | Michaelis et al. |
| 2002/0036800 A1 | 3/2002 | Nozaki et al. |
| 2002/0047870 A1 | 4/2002 | Carro |
| 2002/0048224 A1 | 4/2002 | Dygert et al. |
| 2002/0051010 A1 | 5/2002 | Jun et al. |
| 2002/0059342 A1 | 5/2002 | Gupta et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0070982 A1 | 6/2002 | Hill et al. |
| 2002/0078149 A1 | 6/2002 | Chang et al. |
| 2002/0085759 A1 | 7/2002 | Davies et al. |
| 2002/0087530 A1 | 7/2002 | Smith et al. |
| 2002/0087598 A1 | 7/2002 | Carro |
| 2002/0095460 A1 | 7/2002 | Benson |
| 2002/0095501 A1 | 7/2002 | Chiloyan et al. |
| 2002/0097426 A1 | 7/2002 | Gusmano et al. |
| 2002/0099452 A1 | 7/2002 | Kawai |
| 2002/0099534 A1 | 7/2002 | Hegarty |
| 2002/0101343 A1 | 8/2002 | Patton |
| 2002/0101513 A1 | 8/2002 | Halverson |
| 2002/0116575 A1 | 8/2002 | Toyomura et al. |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0135808 A1 | 9/2002 | Parry |
| 2002/0137544 A1 | 9/2002 | Myojo |
| 2002/0140993 A1 | 10/2002 | Silverbrook |
| 2002/0159637 A1 * | 10/2002 | Echigo et al. ............... 382/190 |
| 2002/0163653 A1 | 11/2002 | Struble et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/1171857 | 11/2002 | Hisatomi et al. |
| 2002/0185533 A1 | 12/2002 | Shieh et al. |
| 2002/0199149 A1 * | 12/2002 | Nagasaki et al. ............ 714/752 |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0046241 A1 | 3/2003 | Toshikage et al. |
| 2003/0051214 A1 | 3/2003 | Graham et al. |
| 2003/0052897 A1 | 3/2003 | Lin |
| 2003/0065665 A1 | 4/2003 | Kinjo |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0130952 A1 | 7/2003 | Bell et al. |
| 2003/0146927 A1 * | 8/2003 | Crow et al. ............... 345/716 |
| 2003/0156589 A1 | 8/2003 | Suetsugu |
| 2003/0160898 A1 | 8/2003 | Baek et al. |
| 2003/0163552 A1 | 8/2003 | Savitzky et al. |
| 2003/0164898 A1 | 9/2003 | Imai |
| 2003/0177240 A1 | 9/2003 | Gulko et al. |
| 2003/0184598 A1 | 10/2003 | Graham |

| | | | |
|---|---|---|---|
| 2003/0187642 A1* | 10/2003 | Ponceleon et al. | 704/252 |
| 2003/0218597 A1 | 11/2003 | Hodzic | |
| 2003/0220988 A1 | 11/2003 | Hymel | |
| 2003/0231198 A1 | 12/2003 | Janevski | |
| 2004/0006577 A1 | 1/2004 | Rix | |
| 2004/0008209 A1 | 1/2004 | Adams et al. | |
| 2004/0015524 A1 | 1/2004 | Chalstrom et al. | |
| 2004/0024643 A1 | 2/2004 | Pollock et al. | |
| 2004/0036842 A1 | 2/2004 | Tsai et al. | |
| 2004/0037540 A1 | 2/2004 | Frohlich et al. | |
| 2004/0039723 A1 | 2/2004 | Lee et al. | |
| 2004/0044894 A1 | 3/2004 | Lofgren et al. | |
| 2004/0049681 A1 | 3/2004 | Diehl et al. | |
| 2004/0064207 A1 | 4/2004 | Zacks et al. | |
| 2004/0064338 A1 | 4/2004 | Shiota et al. | |
| 2004/0064339 A1 | 4/2004 | Shiota et al. | |
| 2004/0071441 A1 | 4/2004 | Foreman et al. | |
| 2004/0090462 A1 | 5/2004 | Graham | |
| 2004/0100506 A1 | 5/2004 | Shiota et al. | |
| 2004/0118908 A1 | 6/2004 | Ando et al. | |
| 2004/0125402 A1 | 7/2004 | Kanai et al. | |
| 2004/0128514 A1 | 7/2004 | Rhoads | |
| 2004/0128613 A1* | 7/2004 | Sinisi | 715/500 |
| 2004/0143459 A1 | 7/2004 | Engleson et al. | |
| 2004/0143602 A1 | 7/2004 | Ruiz et al. | |
| 2004/0150627 A1 | 8/2004 | Luman et al. | |
| 2004/0156616 A1 | 8/2004 | Strub et al. | |
| 2004/0167895 A1 | 8/2004 | Carro | |
| 2004/0181747 A1 | 9/2004 | Hull et al. | |
| 2004/0181815 A1 | 9/2004 | Hull et al. | |
| 2004/0184064 A1 | 9/2004 | TaKeda et al. | |
| 2004/0207876 A1 | 10/2004 | Aschenbrenner et al. | |
| 2004/0215470 A1 | 10/2004 | Bodin | |
| 2004/0229195 A1 | 11/2004 | Marggraff et al. | |
| 2004/0240541 A1* | 12/2004 | Chadwick et al. | 375/240.01 |
| 2004/0240562 A1* | 12/2004 | Bargeron et al. | 375/240.29 |
| 2004/0247298 A1 | 12/2004 | Ohba | |
| 2004/0249650 A1 | 12/2004 | Freedman et al. | |
| 2005/0038794 A1 | 2/2005 | Piersol | |
| 2005/0064935 A1 | 3/2005 | Blanco | |
| 2005/0068569 A1 | 3/2005 | Hull et al. | |
| 2005/0068581 A1 | 3/2005 | Hull et al. | |
| 2005/0083413 A1 | 4/2005 | Reed et al. | |
| 2005/0125717 A1 | 6/2005 | Segal et al. | |
| 2005/0149849 A1 | 7/2005 | Graham et al. | |
| 2005/0213153 A1 | 9/2005 | Hull et al. | |
| 2005/0216838 A1 | 9/2005 | Graham | |
| 2005/0216852 A1 | 9/2005 | Hull et al. | |
| 2005/0223322 A1 | 10/2005 | Graham et al. | |
| 2005/0225781 A1 | 10/2005 | Koizumi | |
| 2005/0229107 A1* | 10/2005 | Hull et al. | 715/764 |
| 2005/0262437 A1 | 11/2005 | Patterson et al. | |
| 2006/0013478 A1 | 1/2006 | Ito et al. | |
| 2006/0043193 A1 | 3/2006 | Brock | |
| 2006/0092450 A1 | 5/2006 | Kanazawa et al. | |
| 2006/0136343 A1 | 6/2006 | Coley et al. | |
| 2006/0171559 A1 | 8/2006 | Rhoads | |
| 2006/0250585 A1 | 11/2006 | Anderson et al. | |
| 2007/0033419 A1 | 2/2007 | Kocher et al. | |
| 2007/0065094 A1 | 3/2007 | Chien et al. | |
| 2007/0109397 A1 | 5/2007 | Yuan et al. | |
| 2007/0162858 A1 | 7/2007 | Hurley et al. | |
| 2007/0168426 A1 | 7/2007 | Ludwig et al. | |
| 2007/0234196 A1 | 10/2007 | Nicol et al. | |
| 2007/0268164 A1 | 11/2007 | Lai et al. | |
| 2008/0037043 A1 | 2/2008 | Hull et al. | |
| 2008/0246757 A1 | 10/2008 | Ito | |

FOREIGN PATENT DOCUMENTS

| | | |
|---|---|---|
| CN | 1352765 A | 6/2002 |
| CN | 1097394 C | 12/2002 |
| EP | 248 403 B1 | 12/1987 |
| EP | 378 848 A2 | 7/1990 |
| EP | 737 927 B1 | 10/1996 |
| EP | 459 174 B1 | 11/1996 |
| EP | 762 297 A2 | 3/1997 |
| EP | 802 492 A1 | 10/1997 |
| EP | 1 001 605 A2 | 5/2000 |
| EP | 1-079-313 A2 * | 2/2001 |
| EP | 1133170 A2 | 9/2001 |
| EP | 788 064 B1 | 1/2003 |
| EP | 788 063 B1 | 10/2005 |
| GB | 2 137 788 A | 10/1984 |
| GB | 2 156 118 A | 10/1985 |
| GB | 2 234 609 A | 6/1991 |
| GB | 2 290 898 A | 1/1996 |
| GB | 2 331 378 A | 5/1999 |
| JP | 60-046653 | 3/1985 |
| JP | 04-021165 A | 1/1992 |
| JP | 04-225670 | 8/1992 |
| JP | 05-101484 | 4/1993 |
| JP | 06-124502 | 5/1994 |
| JP | H07-284033 | 10/1995 |
| JP | 08-69419 | 3/1996 |
| JP | 8-297677 A2 | 11/1996 |
| JP | H09-037180 | 2/1997 |
| JP | H10-049761 | 2/1998 |
| JP | 10-126723 | 5/1998 |
| JP | H11-341423 | 12/1999 |
| JP | 2000-516006 | 11/2000 |
| JP | 2001-176246 | 6/2001 |
| JP | 2001-228994 | 8/2001 |
| JP | 2003-87458 | 3/2003 |
| JP | 2003-513564 | 4/2003 |
| JP | 2003-514318 | 4/2003 |
| WO | WO 99/18523 | 4/1999 |
| WO | 00/43862 A1 | 7/2000 |
| WO | WO 02/082316 A1 | 10/2002 |

OTHER PUBLICATIONS

Shahraray, Behzad, et al., "Automated Authoring of Hypermedia documents of Video Programs", ACM Multimedia '95 Electronic Proceedings, San Francisco, CA, Nov. 5-9, 1995, pp. 1-12.*

Shahraray, Behzad, et al., "Pictorial Transcripts: Multimedia Processing Applied to Digital Library Creation", IEEE 0-7803-3780-8/97, © 1997, pp. 581-586.*

Klemmer, Scott R., et al., "Books With Voices: Paper Transcripts as a Tangible Interface to Oral Histories", CHI Letters, vol. 5 Issue 1, Apr. 5-10, 2003, pp. 89-96.*

Graham, J., et al., "Video Paper: A Paper-Based Interface for Skimming and Watching Video", ICCE '02, Jun. 18-20, 2002, pp. 214-215.*

Graham, J., et al., "A Paper-Based Interface for Video Browsing and Retrieval", ICME '03, vol. 2, Jul. 6-9, 2003, pp. 749-752.*

Minami, Kenichi, et al., "Video Handling with Music and Speech Detection", IEEE Multimedia, Jul.-Sep. 1998, pp. 17-25.*

Stifelman, Lisa, et al., "The Audio Notebook", SIGCHI 2001, vol. 3, Issue 1, Seattle, WA, Mar. 31-Apr. 5, 2001, pp. 182-189.*

Hecht, David L., "Printed Embedded Data Graphical User Interfaces", Computer, vol. 34, Issue 3, Mar. 2001, pp. 47-55.*

Klemmer, Scott R., et al., "Books With Voices: Paper Transcripts as a Tangible Interface to Oral Histories", CHI 2003, Fort Lauderdale, FL, Apr. 5-10, 2003, pp. 89-96.*

Arai, Toshifumi, et al., "PaperLink: A Technique for Hyperlinking from Real Paper to Electronic Content", CHI 97, Atlanta, GA, Mar. 22-27, 1997, pp. 327-334.*

Roschelle, Jeremy, et al., "VideoNoter: A Productivity Tool for Video Data Analysis", Behavior Research Methods, Instruments & Computers, vol. 23, No. 2, © 1991, pp. 219-224.*

Boreczky, John, et al., "An Interactive Comic Book Presentation for Exploring Video", CHI Letters, vol. 2, Issue 1, Apr. 1-6, 2000, pp. 185-192.*

Buchanan, M. Cecelia, et al., "Multimedia Documents as User Interfaces", INTERCHI '93, Amsterdam, The Netherlands, Apr. 24-29, 1993, pp. 527-528.*

Nelson, Les, et al., "Palette: A Paper Interface for Giving Presentations", CHI '99, May 1999, pp. 1-8.*

Wellner, Pierre, "Interacting with Paper on the DigitalDesk", Communications of the ACM, vol. 36, No. 7, Jul. 1993, pp. 87-96.*

Harada, Komei, et al., "Anecdote: A Multimedia Storyboarding System with Seamless Authoring Support", Multimedia '96, Boston, MA, © 1996, pp. 341-351.*

Mackay, Wendy, et al., "Augmenting Reality: Adding Computational Dimensions to Paper", Communications of the ACM, vol. 36, No. 7, Jul. 1993, pp. 96-97.*

Makedon, Fillia, et al., "Multimedia Authoring, Development Environments and Digital Video Editing", Dartmouth College Technical Report PCS-TR94-231, © 2001, pp. 1-24.*

Mackay, Wendy, et al., "Video Mosaic: Laying Out Time in a Physical Space", Multimedia '94, San Francisco, CA, Oct. 1994, pp. 165-172.*

Tonomura, Yoshinobu, et al., "VideoMAP and VideoSpaceIcon", INTERCHI '93, Amsterdam, The Netherlands, Apr. 24-29, 1993, pp. 131-136 and 544.*

Srinivasan, Uma, et al., "Multi-modal Feature-Map: An Approach to Represent Digital Video Sequences", Visual '99, LNCS 1614, Springer-Verlag, Berlin, Germany, © 1999, pp. 299-306.*

Mulhem, Philippe, et al., "Pivot Vector Space Approach for Audio-Video Mixing", IEEE Multimedia, vol. 10, Issue 2, Apr.-Jun. 2003, pp. 28-40.*

Tonomura, Yoshinobu, et al., "VideoMAP and VideoSpaceIcon: Tools for Anatomizing Video Content", INTERCHI '93, Apr. 24-29, 1993, pp. 131-136 and 544.*

Tonomura, Yoshinobu, et al., "Structured Video Computing", IEEE Multimedia, vol. 1, Issue 3, Sep. 1994, pp. 34-43.*

Configuring A Printer (NT), Oxford Computer Support [online] [Retrieved on Nov. 13, 2003] Retrieved from the Internet<URL: http://www.nox.ac.uk/cehoxford/ccs/facilities/printers/configt.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http:/www.kofax.com/products/ascent/capture>.

PostScript Language Document Structuring Conventions Specification, Version 3.0 (Sep. 25, 1992), Adobe Systems Incorporated.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., (retrieved on Jan. 25, 2005). Retrieved from the Internet: <URL: http://www.siibusinessproducts.com/products/link-ir-p-html>.

"Tasty FotoArt" [online], date unknown, Tague Technologies, Inc., [retrieved on Mar. 8, 3005]. Retrieved from the Internet: <URL: http//www.tastyfotoart.com>.

Gropp, W. et al., "Using MPI-Portable Programming with the Message Passing Interface," copyright 1999, pp. 35-42, second edition, MIT Press.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

European Search Report, EP 04255836, Sep. 12, 2006, 4 pages.

European Search Report, EP 04255837, Sep. 5, 2006, 3 pages.

European Search Report, EP 04255839, Sep. 4. 2006, 3 pages.

European Search Report, EP 04255840, Sep. 12, 2006, 3 pages.

Lamming, M, et al., "Using Automatically Generated Descriptions of Human Activity to Index Multi-media Data," IEEE Multimedia Communications and Applications IEE Colloquium, Feb. 7, 1991, pp. 5/1-5/3.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk by Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Chinese Application No. 2004100849823 Office Action, Jun. 1, 2007, 24 pages.

Chinese Application No. 2004100897988 Office Action, Apr. 6, 2007, 8 pages.

Communication Pursuant to Article 96(2) EPC, European Application No. 04255836.1, Jun. 11, 2007, 10 pages.

"About Telus Investors Glossary," downloaded from http://about/telus.com/investors/glossary.html, downloaded Apr. 14, 2005, pp. 1-7.

Acrobat Reader Version 2.0 (software application), Adobe Systems Incorporated, screenshots Figures 1-10, 1994.

Adobe Premiere (Video Editing Software) from http://www.adobe.com, 2002.

Adobe Acrobat Reader 3.0 Screen Dumps (Fig. 1-3), 1996.

Adobe Systems, Inc., "Adobe Photoshop 4.0 User Guide for Macintosh and Windows," pp. 30-31, 1996.

The Army's Virtual World, pp. 1-6 downloaded from http://www.g4tv.com/screensavers/features/492/The_Armys_Virtual_World.html on Mar. 16, 2005.

Apple Macintosh System 7 Reference Manual, pp. 30-31, 1991.

Ball et al., "Software Visualization in the Large," IEEE Computer, 1996, pp. 33-43, vol. 29.

Becker, D., "Strategy: Outside the Box," CNET News.com, Dec. 10, 2003, pp. 1-7, downloaded Mar. 15, 2005.

Bercker, D., "Players: Clash of the Titans," CNET News.com, Dec. 10, 2003, pp. 1-6, downloaded Mar. 15, 2005.

Begole et al., "Flexible Collaboration Transparency," doc. ID: ncstrl. vatech.su b.—cs/TR-98-11, Virginia Polytechnic Institute and State University, 1998.

Begole et al. "Flexible Collaboration Transparency: Supporting Worker Independence In Replicated Application-Sharing Systems," ACM Transactions On Computer-Human Interaction, Jun. 1999, pp. 95-132, vol. 6, No. 2.

Begole et al., "Supporting Worker Independence in Collaboration Transparency," doc. ID: ncstrl.vatech.subn.—cs/TR-98-12, Virginia Polytechnic Institute and State University, 1998.

Begole et al., "Supporting Worker Independence in Collaboration Transparency," technical report from the Computer Science Department of Virginia Tech, doc. ID: ncstrl.vatech_cs/TR-98-12.

Bobick et al., "A State Based Approach to the Representation and Recognition of Gesture," IEEE Trans. on Pattern Analysis and Machine Intelligence, 1997, pp. 1325-1337.

Boguraev et al., "Salience-Based Content Characterization of Text Documents," Proceedings of the ACL/EACL Workshop on Inteiligent[Sic] Scalable Text Summarization, 1997, Topic Identification, Discourse-Based Summarization, 1997, pp. 1-12.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Boreczky, J. et al., "An Interactive Comic Book Presentation for Exploring Video," Conference on Human Factors in Computing Systems (CHI 2000), ACM Press, 2000, pp. 185-192.

Borland, J., "A New Prime Time," CNET News.com, pp. 1-7, downloaded Mar. 15, 2005.

Boykin et al., "Improving Broadcast News Segmentation Processing," IEEE Multimedia '99, 1999.

Boykin et al., "Machine Learning of Event Segmentation for News on Demand," Communications of the ACM, 2000, pp. 35-41, No. 43.

Brandow et al., "Automatic Condensation of Electronic Publication by Sentence Selection," Information Processing and Management, 1995, pp. 675-685, vol. 31, No. 5.

Brown et al., "Automatic Content-Based Retrieval of Broadcast News," ACM Multimedia 5, San Francisco, CA, 1995.

Byrd, D., "A Scrollbar-Based Visualization for Document Navigation," doc. ID: xxx.cs.IR/9902028, Computer Research Repository: Information Retrieval, 1999.

Chen et al., "Emotion Recognition from Audiovisual Information," Proc. IEEE Workshop on Multimedia Signal Processing, Los Angeles, CA, USA, 1998, pp. 83-88.

Chen et al., "ViBE: A Video Indexing and Browsing Environment," Proceedings of the SPIE Conference on Multimedia Storage and Archiving Systems, Sep. 20-22, 1999, Boston, 1999, pp. 148-164, vol. 3846.

Chiu et al., "NoteLook: Taking Notes in Meetings with Digital Video and Ink," ACM Multimedia 99, Orlando, 1999.

Chiu et al., "Automatically Linking Multimedia Meeting Documents by Image Matching," Proceedings of Hypertext '00, ACM, New York, 2000, pp. 244-245.

Choi, Y-I., "An Integrated Data Model and a Query Language for Content-Based Retrieval of Video," MIS"99, LCNS 1508, Sep. 1998, pp. 192-198.

Christel et al., "Evolving Video Skims into Useful Multimedia Abstractions," Proceedings of the CHI'98 Conference on Human Factors in Computing Systems, Los Angeles, CA, Apr. 1998, pp. 171-178.

Christel et al., "Information Visualization Within a Digital Video Library," Journal of Intelligent Information Systems, 1998, pp. 35-257, vol. 11.

"Computer Terms," downloaded from http://www.park-meadow.org/computersub.--terms.htm, downloaded Apr. 14, 2005, pp. 1-8.

Dellaert at al., "Recognizing Emotion in Speech," Proceedings ICSLP 96, Fourth International Conference on Spoken Language Processing, New York, (Cat. No. 96[th]8206), IEEE, 1996, vol. 1970-1973.

Dimitrova et al., "Video Keyframe Extraction and Filtering: A Keyframe is not a Keyframe to Everyone," CIKM 1997, 1997, pp. 113-120.

Doermann et al., "Applying Algebraic and Differential Invariants for Logo Recognition," Machine Vision and Applications, 1996, pp. 73-86, vol. 9.

Donato et al., "Classifying Facial Actions," IEEE Trans. on Pattern Analysis and Machine Intelligence, 1999, pp. 974-989, Vo. I. 21.

Drucker et al., "SmartSkip Consumer Level Browsing and Skipping of Digital Video Content," Paper: Technology to Help People Find Information, Minneapolis, Minnesota, USA, Apr. 20-25, 2002, pp. 219-226, vol. No. 4, Issue No. 1.

Essa et al., "Coding Analysis Interpretation and Recognition of Facial Expressions," IEEE Trans. on Pattern Analysis and Machine Intelligence, 1997, pp. 757-763, vol. 19.

Face Recognition Techniques described at web site http://www.visionics.com, 2002.

"Flexible JAMM Screenshots," downloaded from internet site http://simon.cs.ct.edu/-jamm, May 4, 2000.

Foote, J. et al., "An Intelligent Media Browser Using Automatic Multimodal Analysis," ACM Multimedia 8, Bristol, UK, 1998.

"Fujitsu Markets Facsimile Connection System for Computer I/O," Comline Telecommunications, Nov. 1989, p. 5.

Furui et al., "Japanese Broadcast news Transcription and Information Extraction," Communications of the ACM, Feb. 2000, pp. 71-73, vol. 43, No. 2.

Gaudiosi, J., "TV Execs Go Gaga Over Gaming," Wired News, pp. 1-3, downloaded Mar. 15, 2005.

Gauvain et al., "Transcribing Broadcast News for Audio and Video Indexing," Communications of the ACM, 2000, pp. 64-70, vol. 43.

Gibbon, D.C., "Generating Hypermedia Documents from Transcriptions of Television Programs Using Parallel Text Alignment," Handbook of Internet and Multimedia Systems and Applications, CRC Press, 1998.

"Glossary for Computer Hardware and Micro Scoope," downloaded from http://www.mumbaicyber.com/glossary.sub.—com.sub.—hardware.sub.—m-icro.asp, downloaded on Apr. 14, 2005, pp. 1-11.

"Glossary: What Does It Mean?" downloaded from http://www.fairfield.k12.ct.us/fairfieldhs/cfairfieldhs03/glossary.htm, downloaded Apr. 14, 2005, pp. 1-3.

Gliedman, "Virtual Office Managers," Computer Shopper, 1998, p. 290, vol. 18.

Gordon, "Using Annotated Video as an Information Retrieval Interface," ACM Proceedings of the 5th International Conference on Intelligent User Interfaces, New Orleans, 2000, pp. 133-140.

Greenberg et al., "Sharing Fisheye Views in Relaxed-WYSIWIS Groupware Applications," Proceedings of the Graphics Interface, Toronto, Canada, May 22-24, 1995, Distributed by Morgan-Kaufmann, pp. 28-38, http://www.cpsc.ucalgary.ca/grouplab/papers/1996/96-Fisheye.GI/gi96_fisheye.html.

Grunin, L., "Action!" PC Magazine, Sep. 1993, p. 240-243, vol. 12, No. 15.

"Hang On-Blue Sky's WinHelp is on the Way," PC Week, Jul. 1995, p. 59.

Hauptmann et al., "Story Segmentation and Detection of Commercials in Broadcast News Video," Advances in Digital Libraries Conference, Santa Barbara, CA, Apr. 22-23, 1998.

Hauptmann et al., "Text Speech and Vision for Video Segmentation: the Information Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO, May 1995, pp. 1-8, http://www.acm.org/sigchi/chi95/Electronic/documnts/papers/mah_bdy_htm.

Hecht, "Embedded Data Glyph Technology for Hardcopy Digital Documents," Proc. SPIE, 1994, pp. 341-352, vol. 2171.

Hecht, "Printed Embedded Data Graphical User Interfaces," IEEE Computer, Mar. 2001.

Hill et al., "Edit Wear and Read Wear," ACM, May 3-7, 1992, pp. 3-9.

Hu et al., "Multimedia Description Framework (MDF) for Content Descriptions of Audio/Video Documents," Fourth ACM Conference on Digital Libraries (DL '99), Aug. 11-14, 1999.

"IBM, Partners Team on Web-Based Image Search, Printing Sep. 29, 1995," Newsbytes News Network.

IBM Technical Disclosure Bulletin,"Quick Selection of Window Environment Coordinates," 1992, pp. 57-60, vol. 35, Iss. #4B.

Identitech Unisys: Unisis Wins Florida Housing Finance Agency Contract; Identitech Provides Workflow Software Solution, Business Editors/Computer Writers, Jun. 1995.

Identitech: Identitech Announces FYI 2.5.2 Release with NT Object Server, SmartForm and ODBC, Editors, Jul. 1996.

Ioffe et al., "Finding People by Sampling," Proc. International Conference on Computer Vision, 1999. pp. 1092-1097.

"IT&T Talk," downloaded from http://www.iib.qld.gov.au/itcareers/talk.asp, downloaded Apr. 14, 2005, pp. 1-4.

Jin et al., "Topic Tracking for Radio, TV Broadcast, and Newswire," Proceedings of the DARPA Broadcast News Workshop, Feb. 28-Mar. 3, 1999, Herndon, VA.

Komlodi et al., "Key Frame Preview Techniques for Video Browsing," Proceedings of the 3$^{rd}$ ACM International Conference on Digital Libraries, Jun. 23-26, 1998, Pittsburgh, 1998, pp. 118-125.

Lam et al., Automatic Document Classification Based on Probabilistic Reasoning: Model and Performance Analysis, IEEE, 1997, pp. 2719-2723, vol. 3.

Langley, "An Analysis of Bayesian Classifiers," Proceedings of the Tenth National Conference on Artificial Intelligence, 1992, pp. 223-228.

Langley, "Induction of Selective Bayesian Classifiers," Proceedings of the Tenth International Conference on Uncertainty in Artificial Intelligence, 1994, pp. 400-406.

Li et al., "Automatic Text Detection and Tracking in Digital Video," IEEE Transactions on Image Processing—Special Issue on Image and Video Processing for Digital Libraries, 2000, pp. 147-156, vol. 9.

Li et al., "Text Extraction and Recognition in Digital Video," Proceedings of the Third IAPR Workshop on Document Analysis Systems, 1998, pp. 119-128.

Li et al., "Text Extraction, Enhancement and OCR in Digital Video," DAS '98, LNCS 1655, pp. 363-377, Springer-Verlag Berlin Heidelberg 1999.

Li et al., "Vision: A Digital Video Library," Proceedings of the 1$^{st}$ ACM International Conference on Digital Libraries, 1996, pp. 19-27.

Liang et al., "Practical Video Indexing and Retrieval Systems," SPIE, 1988, pp. 294-303, vol. 3240.

Lienhart et al., On the Detection and Recognition of Television Commercials,: Proc. IEEE Conf. on Multimedia Computing and Systems, Ottawa, Canada, Jun. 1997, pp. 509-516.

Lison, H. et al., "Sight and Sound," Unix Review, Oct. 1989, pp. 76-86, vol. 7, No. 10.

Ma et al., "An Indexing and Browsing System for Home Video," Invited Paper, EUSIPCO '2000, 10the European Signal Processing Conference, Sep. 5-8, 2000, Tampere, Finland.

Manber, "The Use of Customized Emphasis in Text Visualization," Proceedings of 1997 IEEE Conf. on Information Visualization, 1997, pp. 132-138.

Maybury, "News on Demand," Communications of the ACM, 2000, pp. 33-34, vol. 43.

Maybury et al., "Multimedia Summaries of Broadcast News," International Conference on Intelligent Information Systems, Dec. 8-10, 1997, pp. 447-449.

Maybury et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Processing Techniques," MITRE Technical Report, MTR 99B0000031, Apr. 1999.

Merlino et al., "Broadcast News Navigation Using Story Segmentation," Advanced Information Systems Center, The MITRE Corporation, 1997.

Mohan, "Text-Based Search of TV News Stories," Proc. SPIE, 1996, pp. 2-13, vol. 2916.

"Multimedia" downloaded from http://en.wikipedia.org/wiki/Multimedia, downloaded Apr. 1, 2005, pp. 1-2.

Myers et al., "Multi-View Intelligent Editor for Digital Video Libraries," First ACM and IEEE Joint Conference on Digital Libraries, Jun. 24-28, 2001, Roanoke, VA, pp. 106-115.

Oh et al., "Efficient and Cost-Effective Techniques for Browsing and Indexing Large Video Databases," SIGMOD Conference 2000, pp. 415-426.

Ohmori, Y. et al., "Enhanced MultiMedia Recorder (EMMR): A Tool for Programmable Access to Organized Multimedia Data," John Shori Gakkai Kenkyu Hokoku, 1998, pp. 39-44, vol. 98, No. 35(HI-78).

Okada, H. et al., "Development of Application Programs for Distributed Processing Equipment," Review of the Electrical Communication Laboratories, Jul. 1986, pp. 465-471, vol. 34, No. 4.

Phillips, R.L., "MediaView: A General Multimedia Digital Publication System," Communications of the ACM, Jul. 1991, pp. 75-83, vol. 34, No. 7.

Photina et al., "Improving Acoustic Models with Captioned Multimedia Speech," Proceedings IEEE International Conference on Multimedia Computing and Systems, 1999, pp. 767-771, vol. 2.

Roschelle, J. et al., "VideoNoter: A Productivity Tool for Video Data Analysis," Institute for Research on Learning, California, Psychonomic Society, Inc., Behavior Research Methods, Instruments & Computers, 1991, pp. 219-224, VOl. 23, No. 2.

Rowley et al., "Neural Network-Based Face Detection," IEEE Transactions on Pattern Analysis and Machine Intelligence, 1998, pp. 23-28, vol. 20.

Saur, D.D., "Automated Analysis and Annotation of Basketball Vide," Feb. 1997, SPIE, pp. 176-187, vol. 3122.

Schweighofer et al., "The Automatic Generation of Hypertext Links in Legal Documents," Lecture Notes in Computer Science, Wagner et al., eds., from 7$^{th}$ Intl. Conf. DEXA 96', held Sep. 1996 in Zurich, Switzerland, vol. 1134.

Shahraray et al., "Automatic Generation of Pictorial Transcripts of Video Programs," Proceedings of the SPIE-Int. Soc. Opt. Eng., 1995, pp. 512-518, vol. 2417.

Product Brochure, Shutterfly, downloaded from http://www.shutterfly.com, downloaded Mar. 15, 2005, 10 pages.

Smith et al., "Video Skimming and Characterization Through the Combination of Image and Language Understanding," Computer Vision and Pattern Recognition IEEE, 1997.

Sodergard et al., "Integrated Multimedia Publishing—Combining TV and Newspaper Content on Personal Channels," downloaded from http://www8.org/w8-papers/lb-multimedia/integrated/integrated.html, downloaded Apr. 4, 2002, pp. 1-22.

Sonmez et al., "Multiple Speaker Tracking and Detection: Handset Normalization and Duration Scoring," Digital Signal Processing, 2000, pp. 133-143, vol. 10.

"SPRY Inc.'s Internet Front End Picked for PSI Cable Internet Service," Apr. 1994, Information & Interactive Services Report, vol. 15, No. 7.

Strattner, A., "HP Pioneers I-TV Peripheral Market," Computer Shopper, Feb. 1994, p. 71, vol. 14, No. 2.

Suda et al., "Logo and Word Matching Using a General Approach to Signal Registration," Fourth International Conference on Document Analysis and Recognition, Ulm, Germany, Aug. 18-20, 1997, p. 61-65.

Sumita et al., Document Structure Extraction for Interactive Document Retrieval Systems, Proceedings of SIGDOC 93, 1993, pp. 301-310.

Taghva et al., "An Evaluation of an Automatic Markup System," SPIE Proceedings, Feb. 6-7, 1995, pp. 317-327, vol. 2422.

Taghva et al., "Evaluation of an Automatic Markup System," Proceedings SPIE vol. 2422, Document Recognition II, p. 317-327, Mar. 1995.

Takahashi, D., "Some Garners Scoring Amid Sales Slump, Sales of Video Games Hardware, Software and Peripherals Fall in 2003," San Jose Mercury News, Jan. 22, 2004.

Taxt, "Segmentation of Document Images," IEEE, 1989, pp. 1322-1329, vol. 11.

Tennenhouse et al., "A Software-Oriented Approach to the design of Media Processing Environments," Proceedings of the IEEE International Conference on Multimedia Computing and Systems, 1994, pp. 435-444.

Tonomura et al., "VideoMAP and VideoSpaceIcon: Tools for Anatomizing Video Content," Proc. INTERCHI '93 ACM, 1993, pp. 131-136.

Uchihashi et al., "Summarizing Video Using a Shot Importance Measure and a Frame-Packing Algorithm," Proceedings of the International Conference on Acoustics, Speech, and Signal Processing (Phoenix, AZ), 1999, pp. 3041-3044, vol. 6.

Uchihashi et al., "Video Manga; Generating Semantically Meaningful Video Summaries," ACM Multimedia 99, Orlando, Florida, Oct. 30-Nov. 5, 1999.

"The Unofficial Half Life MOD FAQ Version 2.6," pp. 1-12 downloaded from http://www.planethalflife.com/botman/MOD_FAQ.shtml on Mar. 15, 2005.

Van-Horn-Christopher, D.A., "Have You Talked to Your Computer Today!" Business Forum, 1994, pp. 10-11, vol. 19, No. 3, 4.

Video Content and Management and Publishing Software from Virage, http://www.virage.com, 2002.

"Video Mail Retrieval Using Voice" Cambridge University Engineering Department Computer Laboratory and Olivetti Research Laboratory Summary of Research Found at http://svr-www.eng.com.ac.uk/research/projects/vmr/, 1997.

"VNR Firm Offers Storyboards," PR News, Dec. 4, 1995, downloaded from http://proquest.umi.com/pqdlink?index=20&did=0000000010830394&SrchMode=3&s-id.degree.1&F, downloaded Aug. 9, 2004.

"W3C Issues First Public Draft of Synchronized Multimedia Integration Language (SMIL)," Information Today, Feb. 1998, p. 27, 30, vol. 15, No. 2.

Wactlar et al., "Complementary Video and Audio Analysis for Broadcast News Archives," Communications of the ACM, 2000, pp. 42-27, vol. 43.

Wactlar et al., "Intelligent Access to Digital Video: Informedia Project," Computer, 1996, pp. 46-52, vol. 29.

Web pages from PaperClick.com printed from http://www.paperclick.com on Jun. 14, 2006.

Weiss et al., "Composition and Search with a Video Algebra," IEEE Multimedia, 1995, pp. 12-25, vol. 2.

Wittenburg et al., Browsing with Dynamic Key Frame Collages in Web-Based Entertainment Video Services, in Proceedings of the IEEE International Conference on Multimedia Computing and Sytems, Jun. 7-11, 1999, Florence, Italy, 1999, pp. 913-918, vol. 2.

"Study: Women Over 40 Biggest Online Gamers," CNN Technology, Feb. 11, 2004, pp. 1-2 downloaded from http://www.cnn.com/2004/TECH/fun.games/02/11/video.games.women.reut/ on Mar. 15, 2005.

"C:\. . . \9149920c.wpd—unmodified" Screen Shots of Document Created in Corel WordPerfect, Apr. 30, 2002, 4 pages.

Product Brochure, YesVideo, downloaded from http://www.yesvideo.com/code, downloaded Mar. 15, 2005, 20 pages.

Zhang et al., "Detection of Text Captions in Compressed Domain Video," International Multimedia Conference Proceedings of the 2000 ACM Workshops on Multimedia 2000, Los Angeles, California, United States, pp. 201-204.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Dorai, C. et al., "End-to-End VideoText Recognition for Multimedia Content Analysis," IEEE, International Conference on Multimedia and Expo, Aug. 2001, pp. 601-604.

Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.

Shelbourn, M., et al., "Multimedia in Construction Education: New Dimensions," Automation in Construction, 2001, pp. 265-274, vol. 10, Elsevier.

Machine Translation of JP 10049761 by Mori et al., 9 pages, Dec. 11, 2009.

Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).

Communication Pursuant to Article 96(2) EPC, European Application No. 04255836.1, Jun. 11, 2007, 10 pages.

Abdel-Mottaleb, M, et al., "Face Detection in Complex Environments from Color Images," IEEE ICIP 622-626, 1999. 5 pages.

Adobe Acrobat Reader 3.0 screen dumps (fig. 1-3), 1996. 3 pages.

Arons, B. "SpeechSkimmer: A System for Interactively Skimming Recorded Speech," ACM Transactions on Computer-Human Interaction 4(1):3-38. 38 pages Oct. 15, 2008.

"c:\. . .\9149920c.wpd—unmodified" Screen Shots of document created in Corel WordPerfect, 4 pages (Apr. 30, 2002).

U.S. Appl. No. 10/814,842, Filed on Mar. 30, 2004. Hull et al.

U.S. Appl. No. 10/814,580, Filed on Mar. 30, 2004. Hull et al.

U.S. Appl. No. 10/660,867, Filed on Sep. 12, 2003. Erol et al.

Damiani, E. et al. "A Fine-Grained Access Control System for XML Documents," ACM Transactions on Information and System Security, May 2002, pp. 169-202, vol. 5, No. 2.

Divakaran, A. et al., "Video Browsing System Based on Compressed Domain Feature Extraction," IEEE Transactions on Consumer Electronics 46:637-644. Oct. 15, 2008.

Dorai, C. et al., "Perceived Visual Motion Descriptors from MPEG-2 for content-based HDTV annotation and retrieval," IEEE 3rd Workshop on Multimedia Signal Processing, 147-152. Oct. 15, 2008.

Erol, Berna et al., "Linking Multimedia Presentations With Their Symbolic Source Documents: Algorithm and Applications," ACM Multimedia '03, Nov. 2-8, 2003, pp. 498-507, Berkeley, CA.

Erol, B. et al., "Local Motion Descriptors," IEEE Workshop on Multimedia Signal Processing, 467-472, 2001.

Erol, Berna et al., "Prescient Paper: Multimedia Document Creation With Document Image Matching," $17^{th}$ International Conference on Pattern Recognition, Aug. 2004, 4 pages, Cambridge, U.K.

Erol, Berna et al, "Retrieval of Presentation Recordings With Digital Camera Images," IEE Conference on Computer Vision and Pattern Recognition (CVPR), Jun. 27-Jul. 2, 2004, 2 pages, Washington, D.C.

European Search Report, EP 05008745, Jun. 6, 2005, 4 pages.

"FaceIt Face Recognition Technology Frequently Asked Technical Questions," Visionics Corporation, 36 pages. Oct. 15, 2008.

Foote, J. et al., "Finding Presentations in Recorded Meeting Using Audio and Video Features." ICASPP, 3029-3032, 1999.

Foote, J. et al., "FlyCam: Practical Panoramic Video and Automatic Camera Control," Proceedings of International Conference on Multimedia & Expo, 3:1419-1422, 2000.

Glance, Natalie et al., "Knowledge Pump: Community-Centered Collaborative Filtering," Xerox Research Centre Europe, Grenoble Laboratory, Oct. 27, 1997, pp. 1-5.

Grasso, A. et al., "Augmenting Recommender Systems by Embedding Interfaces Into Practices," Proceedings of the 33rd Hawaii International Conference on System Sciences 2000 IEEE, pp. 1-9.

Grasso, Antonietta et al., "Supporting Informal Communication Across Local and Distributed Communities," Xerox Research Centre Europe, Grenoble, France, 8 pages. Oct. 15, 2008.

Greenberg, Saul, "A Fisheye Text Editor for Relaxed-WYSIWIS Groupware," ACM SIGCHI'96 Conference on Human Factors in Computing System, Companion Proceedings, 1996, pp. 212-213.

Gross, R. et al., "Face Recognition in a Meeting Room," IEEE International Conference on Automatic Face and Gesture Recognition, 294-299. Oct. 15, 2008.

Gross, R. et al., "Towards a Multimodal Meeting Record," Proceedings of International Conference on Multimedia and Expo, 1593-1596. Oct. 15, 2008.

Hoadley, C., "A Very Short Introduction to UNIX," The Metropolitan State College of Denver/Information Technology Center for Technology Services, Apr. 30, 2002, pp. 1-18.

Hsu, R.L. et al., "Face Detection in Color Images," Proc. International Conference on Image Processing, 1046-1049, 2001.

Jang, et al., "Improving Acoustic Models With Captioned Multimedia Speech," IEEE, 1999, pp. 767 771.

Johnson, S.E., "Who Spoke When?—Automatic Segmentation and Clustering for Determining Speaker Turns," Proc. Of Eurospeech, 679-682, 1999.

Kapralos, B. et al., "Eyes 'n. Ear Face Detection," 2001 International Conference on Image Processing, 1:65-69, 2001. 4 pages.

Karasik, Image Processing in Perl Graphic Applications, Google Apr. 2, 2003, pp. 1-12. Oct. 15, 2008.

Khare, R., "Anatomy Of a URL (and other Internet-Scale Namespaces, Part 1)," IEEE Internet Computing, Sep-Oct., 1999, pp. 78-81.

Kimber, D. et al., "Acoustic Segmentation for Audio Browsers," Proc. Interface Conference, Sydney, Australia, 10 pages, 1996.

Lauesen, S., "User Interface Design: A Software Engineering Perspective," preface to p. 11, copyright 2005. 28 pages.

Lee, D. et al., "Segmenting People in Meeting Videos Using Mixture Background and Object Models," Proc. Of Pacific Rim Conference on Multimedia, Taiwan, Dec. 16-18, pages, 2002. 8 pages.

Lienhart, Rainer et al., "Localizing and Segmenting Text in Images and Videos," IEEE Transactions on Circuits and Systems for Video Technology, Apr. 2002, pp. 256-268, vol. 12, No. 4.

Lutz, Raymond, "BrowseFax Initiative," MPFA Information Site, downloaded from Internet, http://www.mtpa.org/pub/browsefax_wp.htm on May 14, 2004, 11 pages.

Maybury, M. et al., "Segmentation, Content Extraction and Visualization of Broadcast News Video Using Multistream Analysis," AAAI Paper, 1997. 11 pages.

Meyers et al., "Facsimile with Encrypted Hard Copy," IBM Technical Disclosure Bulletin, TDB Apr. 1, 1978, pp. 4994-4995, [online] [Retrieved on Apr. 7, 2006] Retrieved from the Internet <URL:http://www.ip.com/pubview/IPCOM0000694470>.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Mircosoft_PowerPoint> 5 pages.

Otsu, N., "A Threshold Selection method From Gray-Level Histograms," IEEE Transactions on Systems, Man and Cybernetics, Jan. 1979, vol. SMC-9, No. 1. 6 pages.

Pfau, T. et al., "Multispeaker Speech Activity Detection for the ICSI Meeting Recorder," Proc. IEEE Automatic Speech Recognition and Understanding Workshop, 4 pages, 2001.

Pingali, G. et al., "Multimedia Retrieval Through Spatio-Temporal Activity Maps," ACM Multimedia 129-136, 2001.

Rist, T. et al. "Adding Animated Presentation Agents to the Interface," ACM International Conference on Intelligent User Interfaces, pp. 79-86, 1997.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Shen, H. et al. "Access Control for Collaborative Environments," CSCW 92 Proceedings, Nov. 1992, pp. 51-58.

Srihari, S.N. et al., "Name and Address Block Reader System for Tax Form Processing," IEEE, 1995, pp. 5-10.

Sloman, M., "Policy Driven Management for Distributed Systems," To be published in Journal of Network and Systems Management, Plenum Press, 1994, vol. 2, No. 4. 21 pages.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Stauffer, C. et al., "Adaptive Background Mixture Models for Real-Time Tracking," Proceedings of Computer Vision and Pattern Recognition, Oct. 15, 2008, 7 pages.

Sun, X. et al., "A Motion Activity Descriptor and its Extraction in Compressed Domain," Proc. IEEE Pacific-Rim Conference on Multimedia (PCM '01), 4 pages, 2001.

Sun, X. et al., "Panoramic Video Capturing and Compressed Domain Virtual Camera Control," ACM Multimedia, pp. 329-338, 2001.

Tritschler, a. et al., "Improved Speaker Segmentation and Segments Clustering Using the Bayesian Information Criterion," Proc. Of Eurospeech, pp. 679-682, 1999.

VideoLogger, Automate Video Acquisition and Production, Virage, Inc., [online] [Retrieved on Apr. 26, 2002] Retrieved from the Internet <URL:http://www.virage.com/products/details.cfm?productID=5&categoryID=1> 3 pages.

Waibel, A. et al., "Advances in Automatic Meeting Record Creation and Access," Proceedings of the International Conference on Acoustics, Speech, and Signal Processing, pp. 597-600, 2001.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Xerox, "Flowport, Effective Document Management," brochure, 2 pages. Oct. 15, 2008.

Xerox, Flowport, Paper that knows where its going, Xerox Corporation, specification sheet, 1 page. Oct. 15, 2008.

Xerox, "Flowport Software, Solutions for the Legal Market from Xerox", 20001 Xerox Corporation, 2 pages.

Xerox, "Flowport™ Xerox Image Routing Software FlowPort Overview," Xerox Corporation, 2003, 4 pages. Oct. 15, 2008.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

Zdnet, "Captured! Three document capture systems tested," Zdnet, Technology & Business, Nov. 28, 2002, [visited on Apr. 29, 2003] <http://www.zdnet.com/au/printfriendly?AT=2000023555-20270277-4>, 8 pages.

* cited by examiner

104 ⇘  
Document Format Specification

602 ⇙  
Audio Feature Extraction

604 ～ Type = Musical recording  
608 ～ Identifier = 1768  
610 ～ Title = Locomotion  
612 ～ Artist = John Coltrane  
614 ～ Collection = Blue Train  
616 ～ Publisher = Blue Note Records  
618 ～ Publication Date = 1957  
620 ～ Begin time = 00:00:00  
622 ～ End time = 00:07:14  
    Graphical Representation = Amplitude curve ～ 624  
    Marker type = bar code ～ 628  
    Marker frequency = 30 sec. intervals ～ 630  
    Layout type = One horizontal time line ～ 632  
634 ～ Layout pages = 1  
    Layout marker placement = Above graphical representation ～ 636  
    Layout meta data placement = Centered at top of page ～ 638

Audio amplitude extraction and graphical approximation. An svg file is output. ～ 606

FIG. 6a

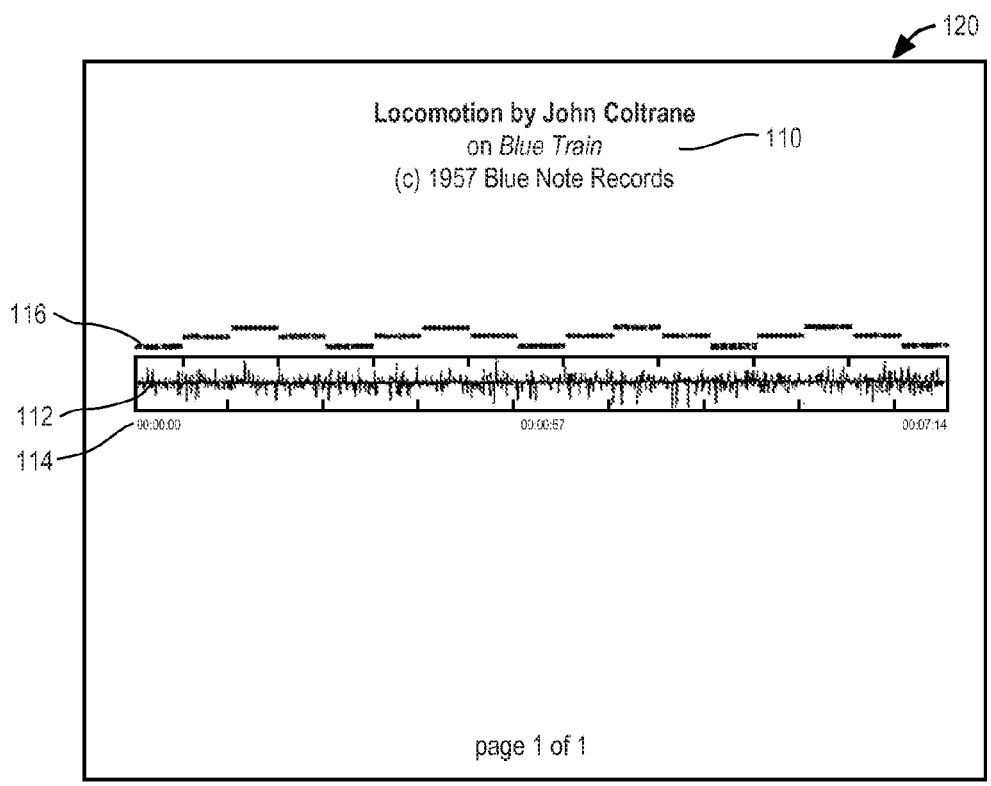

Document Format Specification        Audio Feature Extraction

Type = Musical recording       Audio amplitude extraction and graphical ～ 606
Identifier = 1769                 approximation. An svg file is output. Musical
Title = Locomotion               Solo extraction is also applied. It outputs the
Artist = John Coltrane            beginning times and instrument for each
Collection = Blue Train                         musical solo.
Publisher = Blue Note Records
Publication Date = 1957
Begin time = 00:00:00
End time = 00:07:14
Graphical Representation = Amplitude curve
702 ～ Feature extraction = Musical solos (output is instrument name and time when solo began)
704 ～ Marker type 1 = Instrument name above bar code above time stamp
706 ～ Marker type 2 = bar code
708 ～ Marker2 frequency = 0, 50%, 100%
Layout type = One horizontal time line
Layout pages = 1
Layout marker 1 placement = Above graphical representation ～ 710
Layout marker 2 placement = Below time line ～ 712
Layout meta data placement = Centered at top of page

FIG. 7a

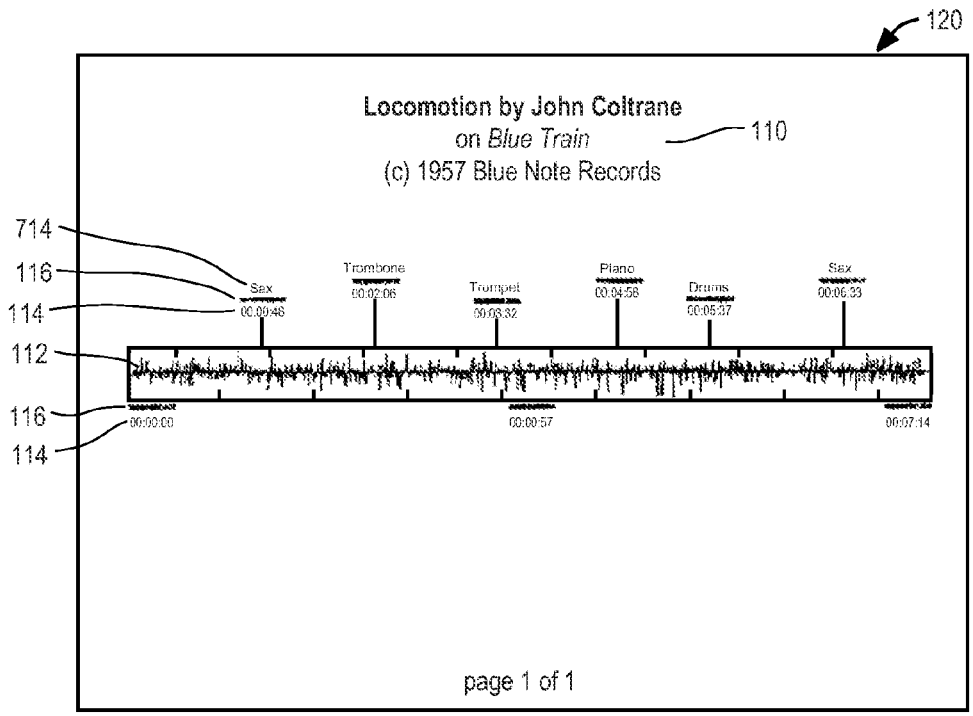

FIG. 7b

104 ↘
Document Format Specification

Type = Radio program
Identifier = 1770
Title = Fresh Air with host Terry Gross
802 ↘ Annotation = Guest Bill O'Reilly
Publication Date = Oct. 8, 2003
Begin time = 00:00:00
End time = 00:40:45
Graphical Representation = Amplitude curve
Marker type = bar code
Marker frequency = regularly spaced
Layout type = One horizontal time line
Layout pages = 1
Layout marker placement = Above graphical representation, 3-step staircase
Layout meta data placement = Centered at top of page ↙ 602
Audio Feature Extraction

Audio amplitude extraction and graphical
approximation. An svg file is output. ～606

FIG. 8a

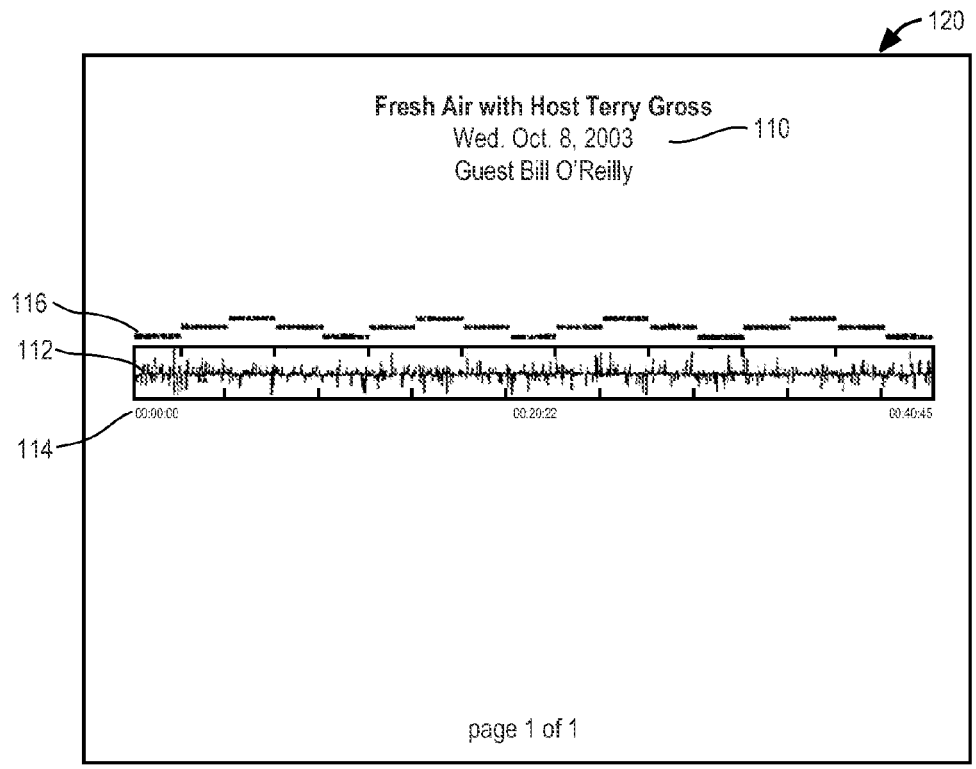

FIG. 8b

Document Format Specification 104

Type = Radio program
Identifier = 1771
Title = Fresh Air with host Terry Gross
Annotation = Guest Bill O'Reilly
Publication Date = Oct. 8, 2003
Begin time = 00:00:00
End time = 00:40:45
Graphical Representation = Amplitude curve
628 — Marker type = keywords, bar code, time stamp
Marker placement = above time line
630 — Marker frequency = user-defined
Marker 1 = (WTC, bar code, 04:28, vert. pos. 1)
902 — Marker 2 = (NY Times, bar code, 09:08, vert. pos. 2)
Marker 3 = (Peabody, bar code, 12:30, vert. pos. 3)
...
Marker 11 = (People Mag, bar code, 39:10, vert. pos. 3)
Layout type = One horizontal time line
Layout pages = 1
Layout marker placement = Above graphical representation, as provided
Layout meta data placement = Centered at top of page

Audio Feature Extraction 602

Audio amplitude extraction and graphical approximation. An svg file is output.

FIG. 9a

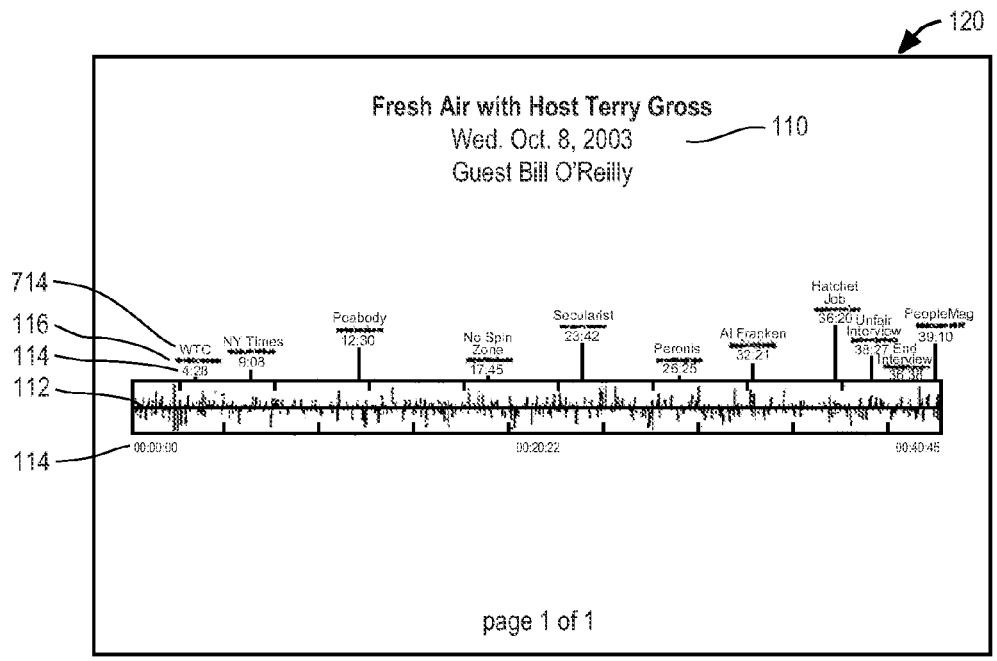

Document Format Specification　　　　Audio Feature Extraction

Type = Radio program　　　　　　　　Audio amplitude extraction and graphical
　　Identifier = 1772　　　　　　　　　　　approximation. An svg file is output.
　　　　　　　　　　　　　　　　　　Speech recognition is also applied followed by
　　Title = Fresh Air with host Terry Gross　　matching to a given list of phrases.
　　Annotation = Guest Bill O'Reilly
　　　　keyword search terms = "New York Terms" and
　　　　　　　　　　　　　　　"fair and balanced"
　　Publication Date = Oct. 8, 2003
　　Begin time = 00:00:00
　　End time = 00:40:45
　　Graphical Representation = Amplitude curve
702 ⌒ Feature extraction = speech recognition and keyword match to "New York Times" or
　　　　　　　　　　　　　"fair and balanced"
628 ⌒ Marker type = matching search term, bar code, time stamp
　　Marker placement = above time line
630 ⌒ Marker frequency = user-defined
902 ⌒　　Marker 1 = ("fair and balanced", bar code, 02:31, vert pos. 2)
　　　　Marker 2 = ("New York Times", bar code, 04:21, vert pos. 1)
　　　　Marker 3 = ("New York Times", bar code, 14:54, vert pos. 2)
　　　　...
　　　　Marker 9 = ("New York Times", bar code, 35:12, vert pos. 3)
　　Layout type = One horizontal time line
　　Layout pages = 1
　　Layout marker placement = Above graphical representation, as provided
　　Layout meta data placement = Centered at top of page

FIG. 10a

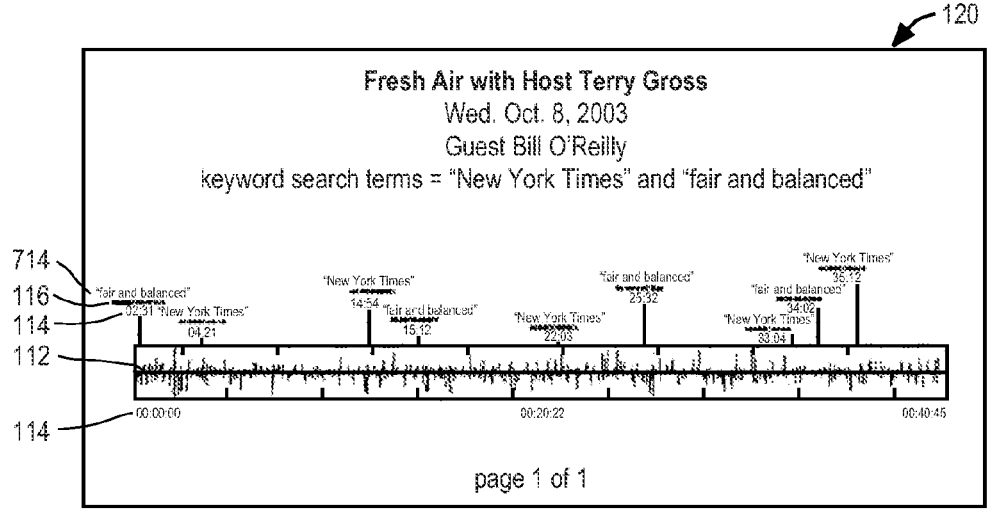

FIG. 10b

104
Document Format Specification

Type = Radio program
Identifier = 1773

Title = A Prairie Home Companion
Annotation = applause events shown
Publication Date = Sun. Oct. 12, 2003
Begin time = 00:00:00
End time = 01:58:56
Graphical Representation = Amplitude curve
702 Feature extraction = applause detection alpha=0.27 beta=1.86
Marker type = time stamp, bar code
Marker placement = above time line
Marker frequency = user-defined
    Marker 1 = (00:02:13, bar code, pos. 1)
    Marker 2 = (00:10:54, bar code, pos. 2)
    Marker 3 = (00:12:32, bar code, pos. 3)
    ...
    Marker 16 = (01:56:01, bar code, pos. 2)
Layout type = One horizontal time line
Layout pages = 1
Layout marker placement = Above graphical representation, as provided
Layout meta data placement = Centered at top of page

602
Audio Feature Extraction

Audio amplitude extraction and graphical approximation. An svg file is output.
Applause detection outputs time stamps.

FIG. 11a

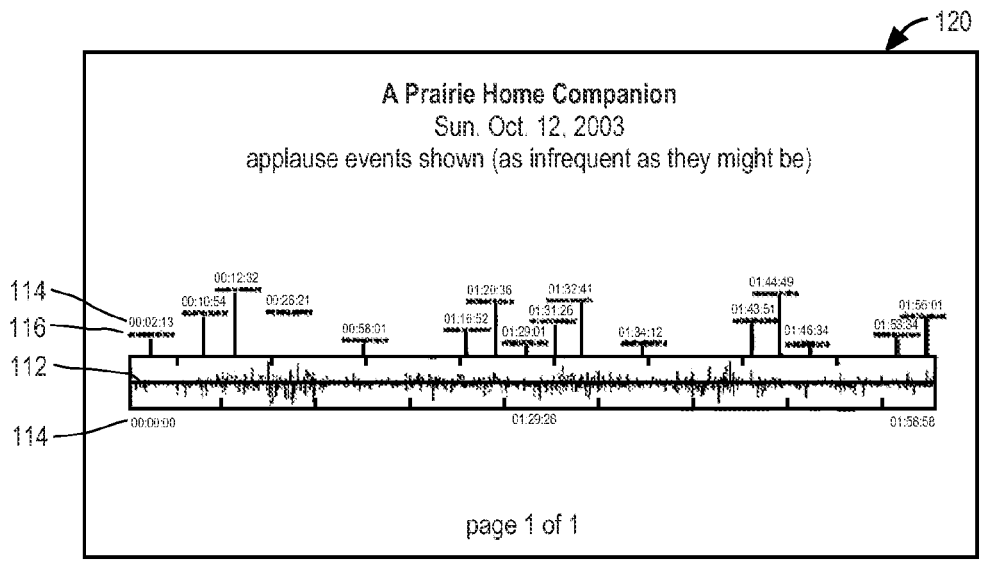

FIG. 11b

104
Document Format Specification

Type = Radio program
Identifier = 1774
Title = A Prairie Home Companion
Annotation = music events shown
Publication Date = Sun. Oct. 12, 2003
Begin time = 00:00:00
End time = 01:58:56
Graphical Representation = Amplitude curve
702 — Feature extraction = music detection delta = 12.93
Marker type = time stamp, bar code
Marker placement = right of time line
Marker frequency = user-defined
    Marker 1 = (00:21:54, bar code, horiz. pos. 1)
    Marker 2 = (01:10:53, bar code, horiz. pos. 1)
    Marker 3 = (01:34:01, bar code, horiz. pos. 1)
    Marker 4 = (01:41:41, bar code, horiz. pos. 1)
632 — Layout type = Two vertical time lines, split in half
Layout pages = 1
Layout marker placement = To right of graphical representation, as provided
Layout meta data placement = Centered at top of page 602
Audio Feature Extraction

Audio amplitude extraction and graphical
approximation. An svg file is output.
Music detection outputs time stamps.

FIG. 12a

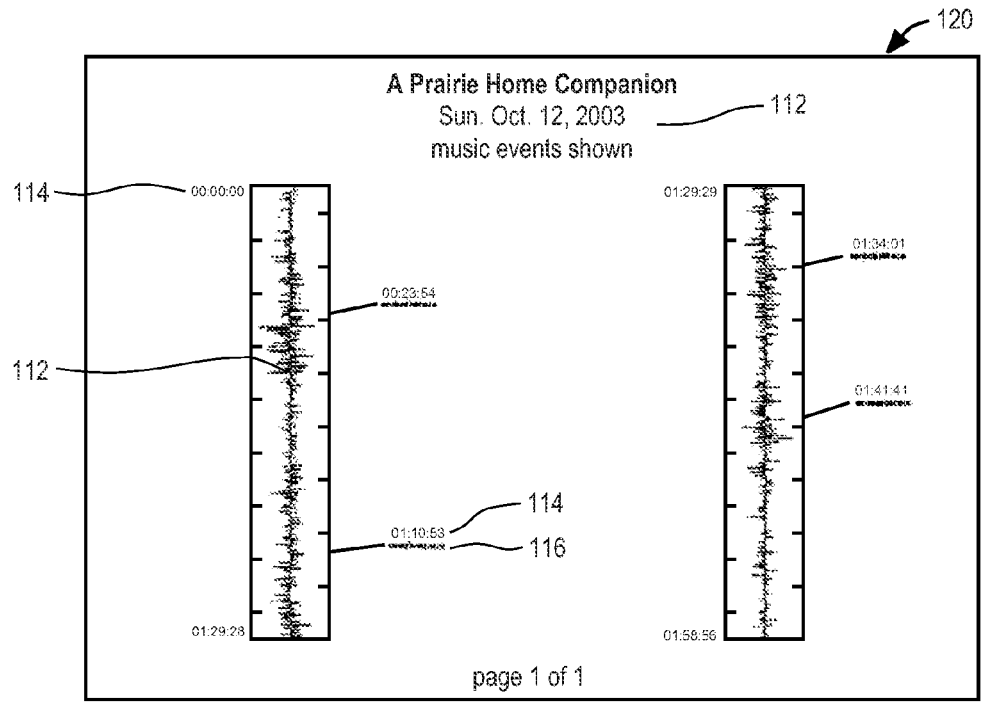

FIG. 12b

PRINTABLE REPRESENTATIONS FOR TIME-BASED MEDIA

CROSS-REFERENCES TO RELATED APPLICATIONS

This application claims the benefit of the following provisional patent applications, each of which is incorporated by reference in its entirety: U.S. Provisional patent application entitled "Printer Including One or More Specialized Hardware Devices" filed on Sep. 25, 2003, having Ser. No. 60/506,303; U.S. Provisional patent application entitled "Printer For Non-Paper and Multiple Media Types" filed on Sep. 25, 2003, having Ser. No. 60/506,411; and U.S. Provisional patent application entitled "Systems and Methods for Printing Audio or Video Paper" filed on Sep. 25, 2003, having Ser. No. 60/506,263.

This application is a related to the following co-pending U.S. patent applications (hereinafter referred to as the "Video Paper Applications"), each of which is hereby incorporated by reference in its entirety: U.S. patent application Ser. No. 10/001,895, "Paper-based Interface for Multimedia Information," filed Nov. 19, 2001; U.S. patent application Ser. No. 10/001,849, "Techniques for Annotating Multimedia Information," filed Nov. 19, 2001; application Ser. No. 10/001,893, "Techniques for Generating a Coversheet for a paper-based Interface for Multimedia Information," filed Nov. 19, 2001; U.S. patent application Ser. No. 10/001,894, "Techniques for Retrieving Multimedia Information Using a Paper-Based Interface," filed Nov. 19, 2001; U.S. patent application Ser. No. 10/001,891, "Paper-based Interface for Multimedia Information Stored by Multiple Multimedia Documents," filed Nov. 19, 2001; U.S. patent application Ser. No. 10/175,540, "Device for Generating a Multimedia Paper Document," filed Jun. 18, 2002; and U.S. patent application Ser. No. 10/645,821, "Paper-Based Interface for Specifying Ranges," filed Aug. 20, 2003.

This application is also related to the following co-pending patent applications, each of which is hereby incorporated by reference in its entirety: U.S. patent application entitled, "Printer Having Embedded Functionality for Printing Time-Based Media," to Hart et al., filed Mar. 30, 2004; U.S. patent application entitled, "Printer With Hardware and Software Interfaces for Peripheral Devices," to Hart et al., filed Mar. 30, 2004; U.S. patent application entitled, "Printer User Interface," to Hart et al., filed Mar. 30, 2004; and U.S. patent application entitled "Networked Printing System Having Embedded Functionality for Printing Time-Based Media," to Hart, et al., filed Mar. 30, 2004.

BACKGROUND OF THE INVENTION

1. Field of the Invention

The present invention relates to systems and methods for generating printable representations for time-based media.

2. Description of the Background Art

Conventional printers are currently used to generate documents of various different formats and based upon different types of content. However, while conventional printers can produce images of text and/or pictures, conventional printers are limited in their ability to effectively generate representations of multimedia content. Conventional printers print onto a fixed medium, such as paper, and thus they are unable to effectively capture the elements of time-based media.

Yet, the capability to easily review time-based media content is commonly needed today. To search for desired features within time-based media content currently, one must actually review the content itself, skimming to find the desired information. For example, a user may have to manually skim an audio recording of a radio talk show to find content on a particular topic or to find discussions by a particular speaker. Due to these limitations in conventional printers, there is currently no easy way for users to search through a lengthy media segment to identify and extract particular features of interest from the media content. Additionally, there is no way for users to create an easily readable representation of media that provides useful information about the media.

Moreover, media content is commonly only available in digital form. However, for many users, a digital format is not the optimal format in which to view information. While viewing media information in digital form is adequate for some users, many users find it easier to comprehend and assimilate information when the information is printed on a paper medium. Nonetheless, there is not currently available a mechanism for generating a paper-based representation of time-based media through which the user can review or even access media content.

Therefore, what is needed is a system and methods for generating a representation of time-based media that can be paper-based and can provide users with the ability to extract defined features in the multimedia content.

SUMMARY OF THE INVENTION

The present invention overcomes the deficiencies and limitations of the prior art with a system and method for generating a representation of time-based media. The system of the present invention includes a feature extraction module for extracting features from media content. For example, the feature extraction module can detect solos in a musical performance, or can detect music, applause, speech, and the like. A formatting module formats a media representation generated by the system. The formatting module also applies feature extraction information to the representation, and formats the representation according to a representation specification. In addition, the system can include an augmented output device that generates a media representation based on the feature extraction information and the representation specification. The representation can be generated in a paper-based format, in digital format, or in any other representation formats. The representation generated can include user-selectable identifiers that enable random access to points along a media content timeline.

The methods of the present invention include extracting features from media content, and formatting a media representation using the extracted features and based on a specification or data structure specifying the representation format. The methods can also include generating a media representation based on the results of the formatting.

BRIEF DESCRIPTION OF THE DRAWINGS

The invention is illustrated by way of example, and not by way of limitation in the figures of the accompanying drawings in which like reference numerals refer to similar elements.

FIG. 6a is a representation of an exemplary document format specification and audio feature extraction.

FIG. 6b is a graphical representation of a multimedia representation generated based on the specification depicted in FIG. 6a.

FIG. 7a is a representation of an exemplary document format specification and audio feature extraction that includes musical solo extraction.

FIG. 7b is a graphical representation of a multimedia representation generated based on the specification depicted in FIG. 7a.

FIG. 8a is a representation of an exemplary document format specification and audio feature extraction for a radio program.

FIG. 8b is a graphical representation of a multimedia representation generated based on the specification depicted in FIG. 8a.

FIG. 9a is a representation of an exemplary document format specification and audio feature extraction including keywords.

FIG. 9b is a graphical representation of a multimedia representation generated based on the specification depicted in FIG. 9a.

FIG. 10a is a representation of an exemplary document format specification and audio feature extraction for speech recognition and word searching.

FIG. 10b is a graphical representation of a multimedia representation generated based on the specification depicted in FIG. 10a.

FIG. 11a is a representation of an exemplary document format specification and audio feature extraction for applause detection.

FIG. 11b is a graphical representation of a multimedia representation generated based on the specification depicted in FIG. 11a.

FIG. 12a is a representation of an exemplary document format specification and audio feature extraction for music detection.

FIG. 12b is a graphical representation of a multimedia representation generated based on the specification depicted in FIG. 12a.

DETAILED DESCRIPTION OF THE PREFERRED EMBODIMENTS

Figure 1:
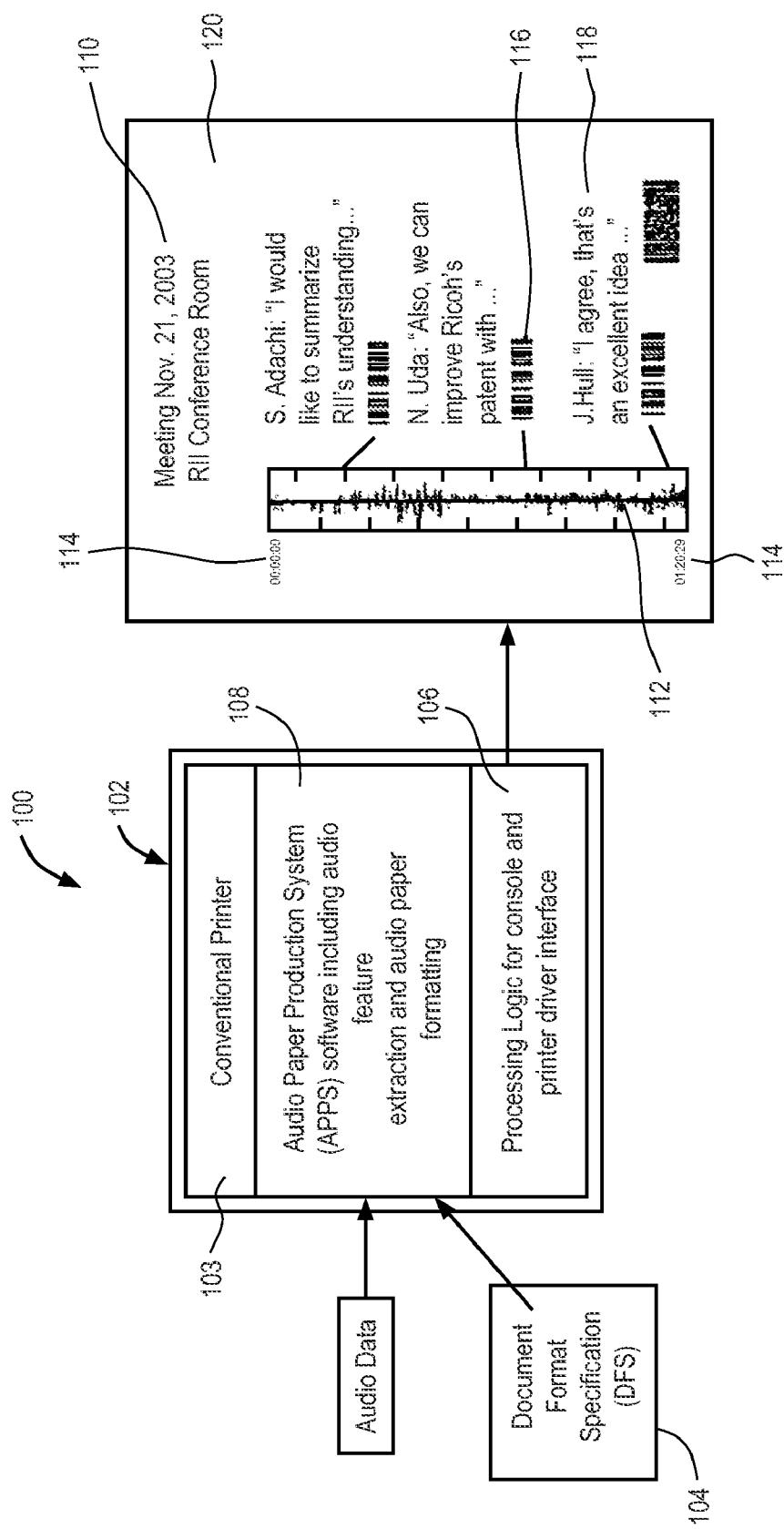
FIG. 1 is a block diagram of a system for generating a representation of the multimedia data.

A system and method for generating a representation of time-based media is described. According to an embodiment of the present invention, a printer generates a representation of time-based media that can incorporate feature extraction information and can be formatted according to a representation specification. More specifically, the printer incorporates a format specification, feature extraction, and a formatting algorithm to produce documents that provide a visual representation for multimedia information (e.g., an audio recording), and provide an index that enables random access to points in a multimedia recording.

For the purposes of this invention, the terms "media," "multimedia," "multimedia content," "multimedia data," or "multimedia information" refer to any one of or a combination of text information, graphics information, animation information, sound (audio) information, video information, slides information, whiteboard images information, and other types of information. For example, a video recording of a television broadcast may comprise video information and audio information. In certain instances the video recording may also comprise close-captioned (CC) text information, which comprises material related to the video information, and in many cases, is an exact representation of the speech contained in the audio portions of the video recording. Multimedia information is also used to refer to information comprising one or more objects wherein the objects include information of different types. For example, multimedia objects included in multimedia information may comprise text information, graphics information, animation information, sound (audio) information, video information, slides information, whiteboard images information, and other types of information.

For the purposes of this invention, the terms "print" or "printing," when referring to printing onto some type of medium, are intended to include printing, writing, drawing, imprinting, embossing, generating in digital format, and other types of generation of a data representation. Also for purposes of this invention, the output generated by the system will be referred to as a "media representation," a "multimedia document," a "multimedia representation," a "document," a "paper document," or either "video paper" or "audio paper." While the words "document" and "paper" are referred to in these terms, output of the system in the present invention is not limited to such a physical medium, like a paper medium. Instead, the above terms can refer to any output that is fixed in a tangible medium. In some embodiments, the output of the system of the present invention can be a representation of multimedia content printed on a physical paper document. In paper format, the multimedia document takes advantage of the high resolution and portability of paper and provides a readable representation of the multimedia information. According to the teachings of the present invention, a multimedia document may also be used to select, retrieve, and access the multimedia information. In other embodiments, the output of the system can exist in digital format or some other tangible medium. In addition, the output of the present invention can refer to any storage unit (e.g., a file) that stores multimedia information in digital format. Various different formats may be used to store the multimedia information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to audio content, and the representation generated by the printer is often referred to as audio paper. However, the features of the present invention apply to any type of media content and refer to media representations in formats other than paper-based formats, even if the description discusses the features only in reference to audio content and audio paper.

Referring now to FIG. 1, an exemplary system 100 for generating a representation of time-based media is shown. In this embodiment, there is shown an augmented output device or a printer 102 for generating multimedia representations. The printer 102 comprises a number of components, including the following: a conventional printer 103, an audio paper production system (APPS) 108, and processing logic 106 for a printer console and for a printer driver interface.

The printer 102 receives multimedia data, such as audio data, and this content may be stored in a multimedia document that is accessible to system 100. The multimedia content may be stored directly on system 100, or it may be information stored on an external storage device or a server (not shown) that can be accessed by system 100. In other embodiments, instead of accessing a multimedia document, the system 100 may receive a stream of multimedia information (e.g., a streaming media signal, a cable signal, etc.) from a multimedia information source. Examples of sources that can provide multimedia information to system 100 include a television, a television broadcast receiver, a cable receiver, a video recorder, a digital video recorder, a personal digital assistant (PDA), or the like. For example, the source of multimedia information may be embodied as a radio that is configured to receive multimedia broadcast signals and to transmit the signals to system 100. In this example, the information source may be a radio antenna providing live radio broadcast feed information to system 100. The information source may also be a device such as a video recorder/player, a digital video disc (DVD) player, a compact disc (CD) player, etc. providing recorded video and/or audio stream to system 100. In alternative embodiments, the source of information may be a presentation or meeting recorder device that is capable of providing a stream of the captured presentation or meeting information to system 100. Additionally, the source of multimedia information may be a receiver (e.g., a satellite dish or a cable receiver) that is configured to capture or receive (e.g., via a wireless link) multimedia information from an external source and then provide the captured multimedia information to system 100 for further processing.

Multimedia content can originate from some type proprietary or customized multimedia player, such as RealPlayer™, Microsoft Windows Media Player, and the like. In alternative embodiments, system 100 may be configured to intercept multimedia information signals received by a multimedia information source. System 100 may receive the multimedia information directly from a multimedia information source or may alternatively receive the information via a communication network (not shown).

Referring again to the components of printer 102, there is shown in FIG. 1 a conventional printer 103 component of printer 102. The conventional printer 103 component of the printer 102 can include all or some of the capabilities of a standard or conventional printing device, such as an inkjet printer, a laser printer, or other printing device. Thus, conventional printer 102 has the functionality to print paper documents, and may also have the capabilities of a fax machine, a copy machine, and other devices for generating physical documents. More information about printing systems is provided in the U.S. patent application entitled "Networked Printing System Having Embedded Functionality for Printing Time-Based Media," to Hart, et al., filed Mar. 30, 2004, which is hereby incorporated by reference in its entirety.

In FIG. 1, there is also shown an audio paper production system (APPS) 108 in this embodiment of the present invention. This system is referred to as an audio paper production system, but it could alternatively be a video paper production system in other embodiments, or any other type of multimedia production system. Additionally, though the APPS 108 refers to the word "paper" in its title, the APPS 108 can also be used to generate multimedia representations in digital format and other types of formats.

The APPS 108 is shown in FIG. 1 as being part of the printer 102. However, in other embodiments, the APPS 108 is located remotely, on a personal computer (PC) (not shown) for example, which can be connected to the printer 102. The APPS 108 includes a feature extraction capabilities and formatting capabilities. An audio file enters the APPS 108 as input and feature extraction techniques are applied to generate a representation 120 of the multimedia content (i.e., a representation of audio content in waveform). The representation or document 120 can include markers for particular features recognized within the multimedia content during feature extraction. For example, the representation 120 could include markers for each time, along an audio timeline, that applause occurs or for each time there is a saxophone solo within a music track. The feature extraction techniques applied may be user defined, or may alternatively be set by a default printer 102 setting. The formatting functionality of the APPS 108 uses the feature extraction results and applies the formatting according to a document format specification (DFS) 104.

In some embodiments, the user can set formatting preferences with regard to the document 120 produced by entering information into fields provided in the DFS 104. In some embodiments, the user can set preferences as to document format and layout, font type and size, information displayed in each line, information displayed in a header, size and location of schedule columns, font colors, line spacing, number of words per line, bolding and capitalization techniques, language in which the document is printed, paper size, paper type, and the like. For example, the user might choose to have a multimedia document that includes a header in large, bold font showing the name of the multimedia content being displayed (e.g., CNN News segment), and the user can choose the arrangement of the graphical representation of multimedia content displayed per page.

The DFS 104 determines the feature extraction that is applied to the audio data and the format guidelines used to product the output document 120. The DFS 104 is a data structure that can be supplied by an external application, such as a print driver dialog interface on a PC (not shown), or it can be determined internally by interacting with the APPS 108 on the printer's console (not shown). The DFS 104 represents the transformation(s) of the multimedia data. The DFS 104 is used to populate a user interface that is displayed to the user, giving the user formatting options. The DFS 104 determines the feature extraction options presented to the user, which can be applied to the multimedia data. The DFS 104 also determines the format guidelines used to produce the output document.

The DFS 104 can include meta data information about an audio file, such as information about the title of the audio content, the composer of the audio content, and the like. The DFS 104 can also include other information, such as beginning and ending times of a segment (e.g., beginning and ending times of an audio recording), and a specification for a graphical representation of the multimedia data that can be displayed along a time line (e.g., a waveform showing the amplitude of an audio signal over time). The DFS 104 can further include a specification for time stamp markers and meta-data for each time stamp (i.e., a barcode, an RFID tag, a URL, or some other indication for the location where the multimedia data can be retrieved from) that could be displayed along the timeline, and layout parameters that determine the appearance of the physical multimedia document 120.

In the embodiment shown in FIG. 1, the printer 102 additionally comprises processing logic 106 for a printer console and for a print driver interface. The processing logic 106 interacts with the user through a print driver dialog interface (not shown). For example, the processing logic 106 manages the display of a user interface that allows the user to control certain printer actions, such as the processing of the multimedia content or the format in which the multimedia content will be displayed in a multimedia representation 120. Alternatively, the functionality of the user interface can be provided by a web interface, allowing the user to manage printer actions, such as formatting issues, through this web interface. Additionally, the processing logic 106 can return a paper or electronic format for the audio paper. For example, in some embodiments, the user can choose the format in which the representation will be printed. In other embodiments, the printer 102 automatically applies a default setting regarding the format of the representation.

The multimedia document 120 generated by the printer 102 can comprise various formats. For example, the multimedia document 120 can be a paper document, such as an audio paper document 120 of the form shown in FIG. 1. The multimedia document 120 produced by the printer 102 can be also stored on digital media. The digital media writing hardware can include, for example, a network interface card, a DVD writer, a secure digital (SD) writer, a CD writer, and the like. The multimedia content can be stored on digital media, such as flash media, a DVD, a CD, and the like.

The multimedia document 120 can have a number of different types of layouts and can display various types of information. FIG. 1 provides an example of an audio paper document 120 displaying audio content, though in other embodiments the document may be a video paper document displaying video content. More information about generation of video paper documents is provided in the Video Paper Applications, each of which is hereby incorporated by reference in its entirety.

In the FIG. 1 example, the audio paper document 120 includes an audio waveform 112 display of audio information. The layout and format information may specify the length of audio content to be extracted from an audio recording, the arrangement of the audio waveform 112 on the medium, and other like information. For audio information, the printer 102 can extract segments that capture salient features of the audio (or frames that are informative) for a particular segment of the multimedia information. Additionally, as discussed previously, the printer 102 may include feature extraction capabilities (e.g., audio event detection, and the like), allowing the user to search within an audio segment for items of interest, such as for certain speakers, for music, for laughing or yelling, etc. The document 120 produced can display one audio waveform 112 or can divide audio content to be displayed over more than one audio waveform 112. The audio waveform 112 in FIG. 1 is displayed vertically, but in other embodiments the audio waveform 112 can be displayed in other arrangements.

Additionally, the audio waveform 112 of FIG. 1 includes time stamp markers 114 marking the beginning and the end of the audio content displayed over the audio waveform 112. As an alternative, the audio waveform 112 can include numerous time stamp markers 114 along the length (i.e., possibly user-defined locations of markers), or the document 120 can include no time stamp markers 114 at all.

In the FIG. 1 embodiment of the audio paper 120, the document 120 can contain a header 110. The header 110 provides general information about the audio content included in the document 120. For example, the header 110 may include information about the type of audio content displayed on the document 120 (e.g., "Meeting"), the date of recording of the audio content (e.g., "Nov. 21, 2003"), and the location at which the audio content was recorded (e.g., "RII Conference Room").

In another embodiment of the present invention, user-selectable identifiers 116 (e.g., a barcode or textual tag) are associated the audio waveform 112. In the FIG. 1 example, the user selectable identifiers 116 are displayed on the right side of the audio waveform 112 at user-defined locations, but these can alternatively be displayed anywhere on the page. These identifiers 116 act as index markers, allowing a user to access the associated audio content. For example, in a document 120 printed on paper, the user can physically scan a barcode identifier 116 on the page, and this identifier will point to an audio segment within the audio content displayed on the audio waveform 112. A user selects the user-selectable identifier 116 by scanning the appropriate barcode on the paper document 120 using any type of device (not shown) that has a barcode scanner incorporated into it, such as a cell phone or a personal digital assistant (PDA).

The audio file can be played on a device that allows the random access technique (e.g., barcode scanning) assumed when the document was generated. For example, a document that contains barcodes can be played on a cell phone with a barcode reader and software that can convert barcodes to commands that play an audio file starting at a given point. Thus, the user-selectable identifiers 116 act as an interface to permit users to access or retrieve the multimedia content displayed on the multimedia document 120.

As one example, by scanning the barcode of FIG. 1, the user can cause the audio segment to begin playing from the marked location on a display device (e.g., a television, a PC monitor, a cell phone screen, a PDA, and the like) and the user can listen to the content. The multimedia document 120 can even provide tactile feedback, by causing a PDA to hum, for example, during parts of a recording that is being played. As another example, the paper multimedia document 120 can also or alternatively include numerical identifiers included instead of or in addition to barcode markers, and the user can type these numerals into a keypad or touchpad (not shown) on the printer 102 or on an external device to direct the system 100 to play an audio segment on a printer display or on the display device. Alternatively, if the audio paper document 120 shown in FIG. 1 were in digital format, the system 100 could be configured so that a user could select an audio segment to be played directly from the digital document (i.e., by clicking on the location in the audio waveform 112 with a mouse or other selection device or by selecting a play button).

The printer 102 is capable of retrieving multimedia information corresponding to the user-selectable identifiers 116. The signal communicated to the printer 102 from the selection device (i.e., device with barcode scanner or keypad for entering in numerical identifiers) may identify the audio segment selected by the user, the location of the audio content to be played, the multimedia paper documents from which the segments are to be selected, information related to preferences and/or one or more multimedia display devices (e.g., a cell phone) selected by the user, and other like information to facilitate retrieval of the requested multimedia information. For example, the system 100 can access an audio file stored on a PC (not shown), and the system can play this audio content on the user's command.

The example of FIG. 1 further shows text information 118 next to marked locations along the audio waveform 112 in the document 120. In this example, the text information 118 includes portions of a transcript of a conversation that correspond to the marked location along the audio waveform 112. Thus, by selecting the user-selectable identifier 116, the user can cause the audio content to begin playing at the start of the text information 118 that corresponds to the user-selectable identifier 116. Various other types of text information 118 can be also or alternatively displayed along the audio waveform 112 timeline in the document 120, such as summaries of conversations, speaker names, and the like.

The multimedia document 120 produced by system 100 can be used in a number of different ways. For example, the document 120 provides the user with a convenient way to visually review audio data by searching for particular audio content of interest, providing markers and even text regarding this selected content, and even providing an interface through which the user can access and play audio content. There can also be numerous variations on this type of multimedia document 120. For example, the user can print double-sided video or audio paper. In this example, the user prints a multimedia document 120 on a printer that can apply ink to both sides of a document. The original audio or video paper format can be printed on the front side of the document. The reverse side can show a two-dimensional barcode representation for the data represented on the front. This format provides a stand-alone paper-based representation that could be stored in a filing cabinet, for example, and subsequent retrieval of the multimedia content would not require reference to an off-paper representation. In the case of double-sided video paper, the video would need to be super-compressed because of the limited capacity of a typical two-dimensional barcode. A combination technology could be used that would extract a rough approximation of the digital data (e.g., the low frequency components of the FFT) from the images printed on the front of the document and supplement that with the higher frequency components, as encoded in the two-dimensional barcode.

As another example, a user can create a perforated multimedia document 120, such as perforated video or audio paper. For example, the user can print a video file that has been segmented into scenes that are each printed on a different perforated strip of paper. Each strip can contain at least one video frame from the video content, and at least one barcode that refers to an online repository of the video data. The strips could be pasted into a notebook or tacked onto a bulletin board, for example. In the case of perforated audio paper, the user can print an audio file that has been segmented by speaker, sound localization, audio event detection, and the like, and each of these segmentation types can be printed on a different perforated strip of paper. For example, one strip could contain barcodes that point to the instances when people were arguing during a meeting. Each strip can contain at least one barcode that refers to an online repository of the audio data. However, because the amount of multimedia data can be limited, a two-dimensional barcode could be used to provide a complete stand-alone representation for the multimedia. These strips could be cut out and easily moved around by someone who needs to edit the audio recording or by someone who needs to remember only small pieces of the recording. As stated above, the strips could also be pasted into a notebook or tacked onto a bulletin board.

As another example, the user can create a DVD or CD cover sheet using a multimedia document 120. In this example, the user can print a DVD or CD using this printing technology. Additionally, the printer 102 can be programmed to automatically produce a cover sheet that shows video frames from the scenes segmented from the video file and barcodes that refer to those scenes. This cover sheet can be printed on small paper stock that could be inserted into a special tray in the printer 102, for example. Alternatively, the cover sheet can be printed on normal paper stock and provided with fold-marks that indicate how the paper should be folded so that it fits in the typical DVD holder. A similar cover sheet can be printed for a music CD displaying an audio waveform 122 timeline showing markers for user-selected content and barcodes that refer to the marked portions of the audio content. More information about generating printable representations of multimedia information is provided in the Video Paper Applications, referenced above.

Figure 2:
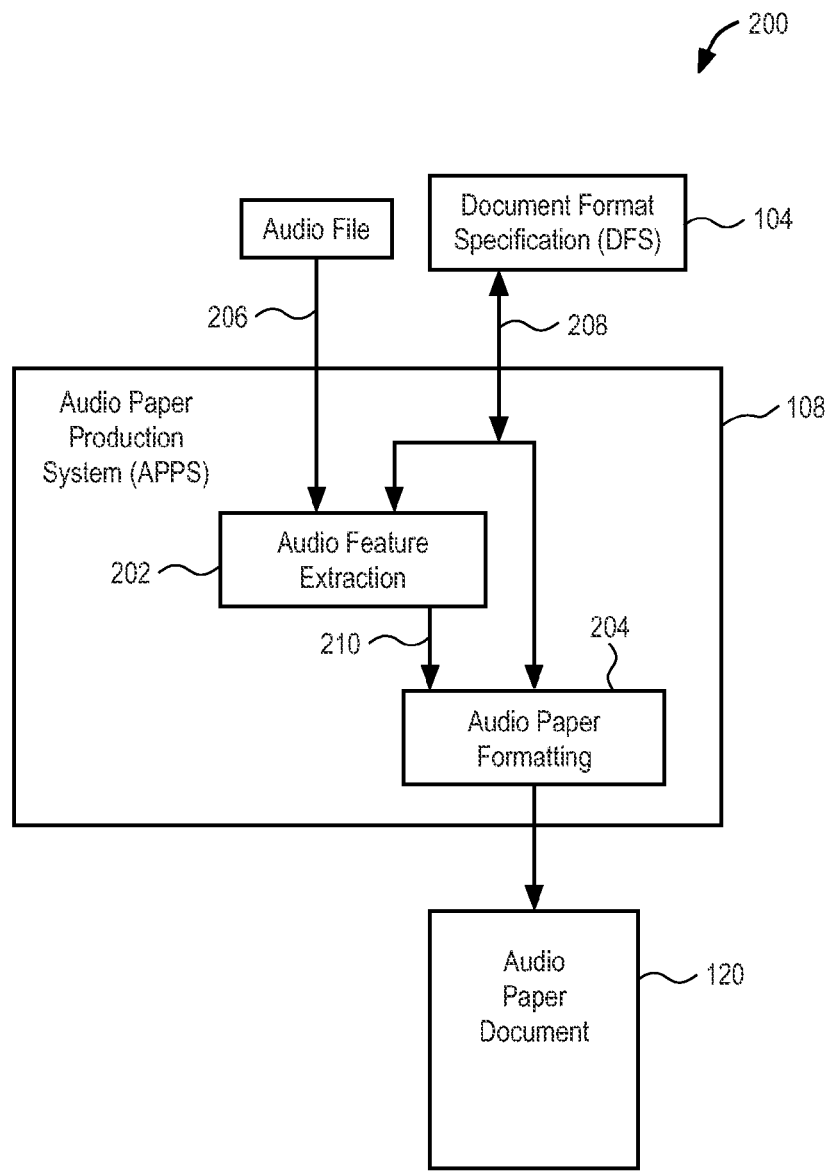
FIG. 2 is a block diagram of an exemplary architecture for one embodiment of the system of FIG. 1.

Referring now to FIG. 2, there is shown the architecture of an embodiment of the present invention. In this embodiment, the system 200 includes an APPS 108 that can process audio files that are input into the system 200. The APPS 108 can be located on printer 102 or it can be located on a data processing system (not shown), which could include a PC, a portable computer, a workstation, a computer terminal, a network computer, a mainframe, a kiosk, a standard remote control, a PDA, a game controller, a communication device such as a cell phone, an application server, or any other data system. Alternatively, the APPS 108 might be located on a printer 102 that is coupled to a data processing system.

In the example of FIG. 2, the APPS 108 comprises the following components: a feature extraction module 202 and a formatting module 204. As described previously, the system 200 accesses or receives multimedia information, such as an audio file. The file can be stored on the system 200 or stored on a data processing system (not shown), which is coupled to the printer. In the FIG. 2 embodiment, the user can listen to an audio file using any one of various standard multimedia playing tools that allow the user to play back, store, index, edit, or manipulate multimedia information. Examples include proprietary or customized multimedia players (e.g., RealPlayer™ provided by RealNetworks, Microsoft Windows Media Player provided by Microsoft Corporation, QuickTime™ Player provided by Apple Corporation, Shockwave multimedia player, and others), video players, televisions, PDAs, or the like.

An audio file can enter the APPS 108 through a data port 206. This port can include any type of data port, such as an Ethernet connection, over which data can enter printer 102. Additionally, the DFS 104 is input into APPS 108 over connection 208, which couples the APPS 108 to the storage location (not shown) of the DFS 104. Both the feature extraction module 202 and the formatting module 204 can use the DFS 104 information. The DFS 104 defines the feature extraction techniques to be applied to the multimedia content by the feature extraction module 202, and the DFS 104 defines the document formatting information to be used by the formatting module 204

The DFS 104 includes various different types of information. The DFS 104 includes meta data about an audio file for which a representation is being generated. For example, the DFS 104 can include information such as the title of the audio recording, the artist, the publisher, and the like. The DFS 104 can include beginning and ending times relative to the recording. The DFS 104 can also include a specification for a graphical representation of the audio data that can be displayed along a timeline. For example, the graphical representation can be an audio waveform, as discussed in FIG. 1. The waveform can show the amplitude of the audio signal over time, and the user can zoom into and out of the audio waveform when necessary. Another example would be a JPEG for a waveform. The DFS 104 can also include a specification for time stamp markers and meta data for each time stamp or user-selectable identifiers (i.e., textual tags or barcodes), that could be displayed along the timeline.

Layout parameters can also be defined in the DFS 104, in which the parameters determine the appearance of the physical document 120 created. The layout parameters can include, for example, a specification for the portion of the timeline that will be displayed on each page of document 120. The generation of the layout can be determined by a default behavior specification, stored in the printer default settings (e.g., Printer Properties). This can include the autonomous productions of a paper document 120 or an interactive process using a user interface on a printer's console, a web page, etc.

The feature extraction module 202 produces the graphical representation, and the user-selectable identifiers 116 and time stamps specified in the DFS 104. Examples of a graphical representation include a curve that shows the amplitude of an audio file over time. Examples of other features that could be used to produce user-selectable identifiers 116 include the detection of solos in a musical performance, speech recognition, applause detection, detection of music, and the like.

The formatting module 204 is coupled to the feature extraction module by connection 210. Feature extraction data is sent over connection 210 to the formatting module 204 for use in formatting the document 120. The formatting module 204 converts the audio features and the DFS 104 into a document representation that can be rendered on paper or as an electronic file, such as a PDF document. The DFS 104 contains detailed information about the fonts to be used and other information that is typically provided by a document-formatting package (e.g., Microsoft Word). This layout information will be included in the "layout" field of the DFS 104, discussed below.

The system 200 of FIG. 2 can also include a processor (not shown), in printer 102, which processes data signals. The processor (not shown) may comprise various computing architectures including a complex instruction set computer (CISC) architecture, a reduced instruction set computer (RISC) architecture, or an architecture implementing a combination of instruction sets. The system 200 can include a single processor or multiple processors. Main memory (not shown) may store instructions and/or data that may be executed by processor 214, including the software and other components of system 200. The instructions and/or data may comprise code for performing any and/or all of the techniques described herein. Main memory (not shown) may be a dynamic random access memory (DRAM) device, a static random access memory (SRAM) device, or some other memory device known in the art.

When printer 102 receives a print request, the request and the associated multimedia data is transferred to a processor (not shown), in some embodiments. The processor interprets the input and activates the appropriate module. In some embodiments, the processor is coupled to and controls the feature extraction module 202 for transforming multimedia content. Additionally, the processor is coupled to the formatting module 204 for controlling formatting of document 120, in some embodiments. The APPS 108 generates the appropriate document-based representation and can interact with the user through a print driver dialog interface (not shown) to modify the parameters of the document 120 generation and to preview the results. The results and parameters of the multimedia transformation are represented in the DFS 104. The processor (not shown) can also manage generation of a document 120, by communicating with and sending print job information to a conventional printer (not shown), and the conventional printer (not shown) generates a paper output. As previously described, the document 120 can also include user-selectable identifiers, such as barcodes, and other links to multimedia data stored by the printer 102 or stored in a specified online database (not shown).

Figure 3:
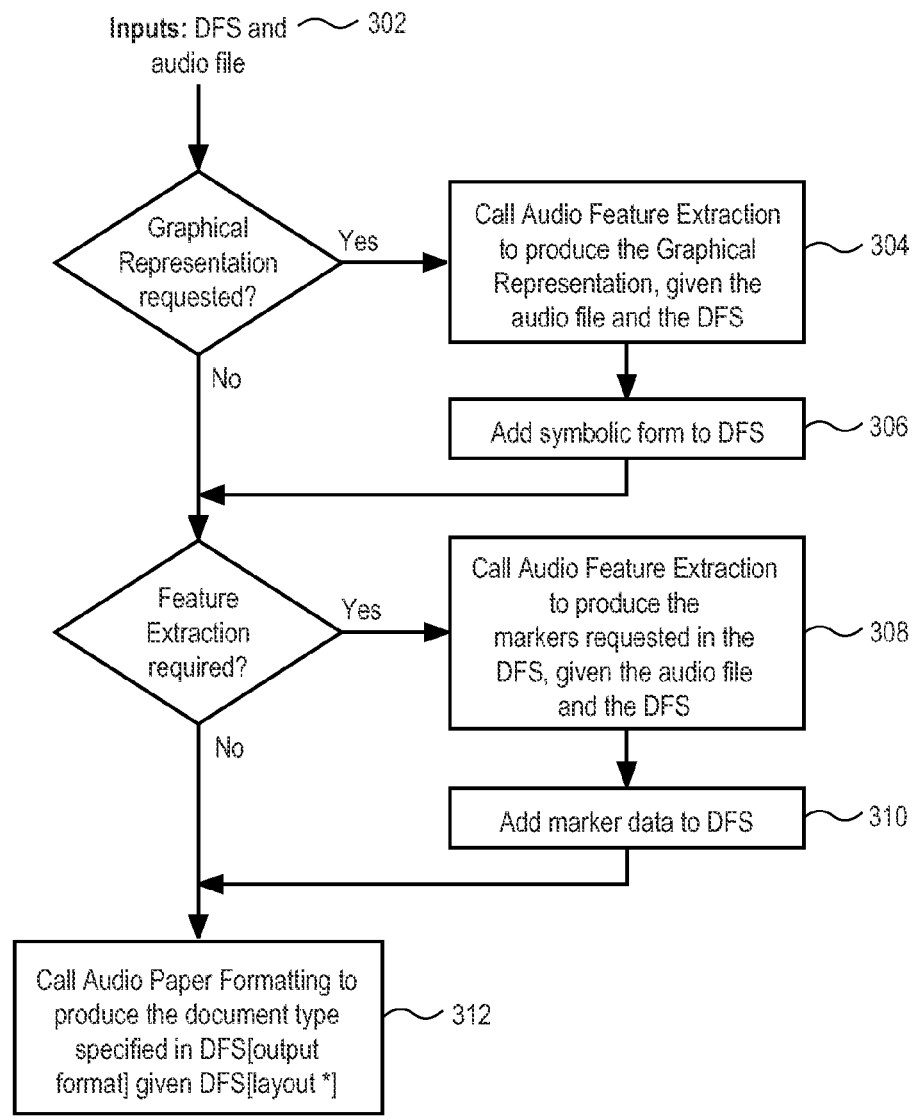
FIG. 3 is a flowchart of a method for operation of an audio paper production system.

In operation, the system 200 provides methods for printing multimedia content, and in the specific examples given in the Figures, the system 200 provides methods for printing audio content. Referring now to FIG. 3, there is shown a flowchart that describes processing steps in an audio paper production system 108. The APPS 108 is coupled to a control program that runs the subroutine process, as described below. In this embodiment, the processing steps of the APPS 108 include inputting 302 an audio file into the system and inputting 302 the DFS 104 into the system. Based on the user's instructions, the APPS 108 determines whether or not a graphical representation has been requested. If not, the APPS 108 moves on to determining if feature extraction is required. If so, the APPS 108 then calls 304 the feature extraction module 202 of the system 200 to produce the graphical representation using the audio file information and the information provided in the DFS 104. The APPS 108 updates the DFS 104 by adding 306 a symbolic form or representation of the feature extraction results as one of the document specification fields listed in the DFS 104.

As a next step in the process, the APPS 108 determines if feature extraction is required. If not, the APPS 108 moves onto calling 312 the formatting module 204 to produce the document type specified in the DFS 104 output format listed in the "layout" field of the DFS 104. If so, the APPS 108 calls 308 the feature extraction module 202 to produce the markers requested in the DFS 104 using the audio file information and the information included in the DFS 104. The APPS 108 then adds 310 marker data to the DFS 104. Once this step is completed, the APPS 108 calls 312 the formatting module 204 to produce the document type specified in the DFS 104 output format listed in the "layout" field of the DFS 104.

Figure 4:
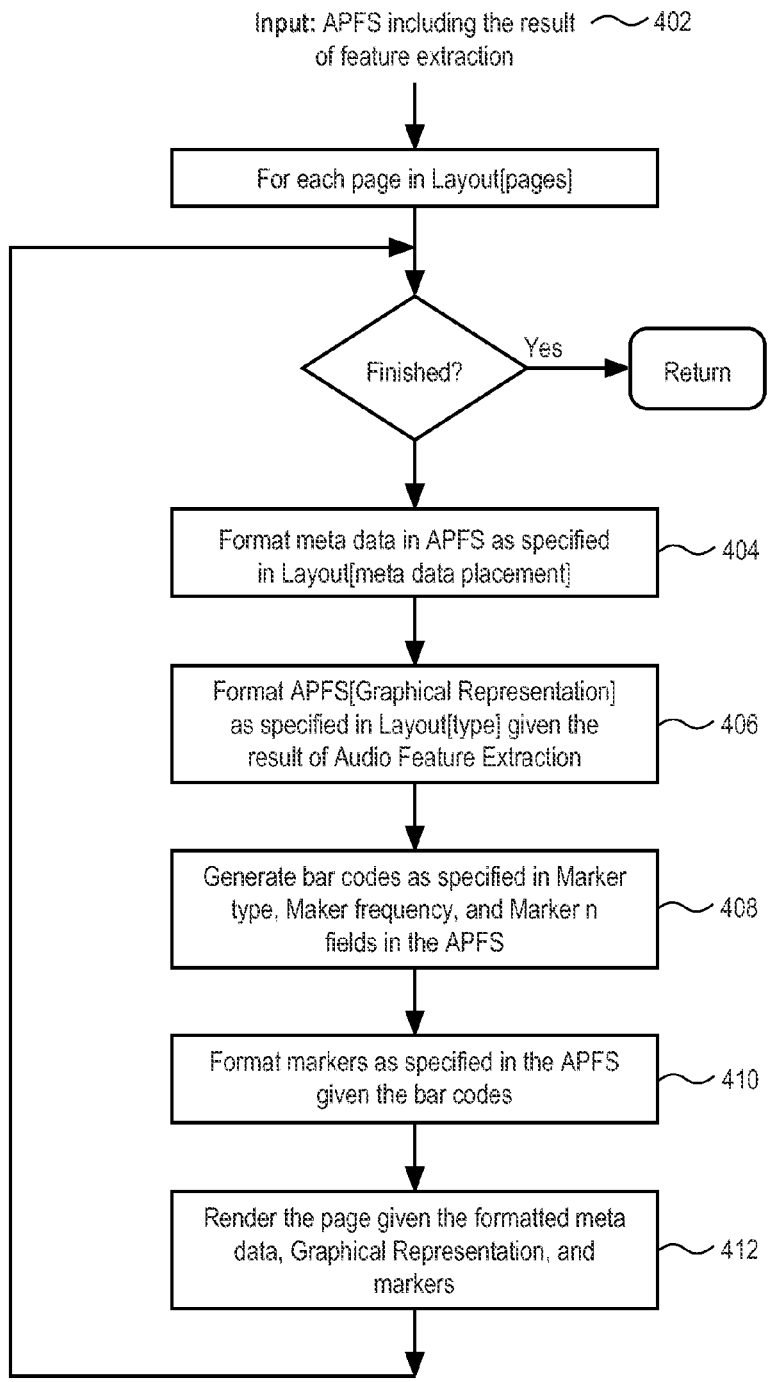
FIG. 4 is a flowchart of a method for operation of a formatting module in formatting multimedia content.

Referring now to FIG. 4, there is shown a flowchart describing the operations of the formatting module 204. The formatting module 204 is coupled to a control program that runs the subroutine process, as described below. In this embodiment, the processing steps of the formatting module 204 include inputting 402 the results of feature extraction conducted by the feature extraction module 202. For each page listed in the "layout page" field of the DFS 104, the formatting module 204 determines if the formatting of the page is finished. If it is, the formatting module 204 sends a return message to the control program. If it is not finished, the formatting module 204 formats 404 meta-data in the formatting module 204 as specified in the "layout" field of the DFS 104 regarding "meta-data placement." The formatting module 204 then formats 406 the graphical representation created by the feature extraction module 202, as specified in the "layout type" field of the DFS 104, based on the result of the feature extraction. The formatting module 204 generates 408 barcodes, according to the "marker type" field of the DFS 104, the "marker frequency" field of the DFS 104, and the "marker n" field of the DFS 104. The markers are then formatted 410 as specified in the formatting module 204 given the barcodes. The system then renders 412 the page given the formatted meta-data, graphical representation, and markers. Once this process is finished for a page, the formatting module 204 then runs through this process for the next page in the "layout pages" field of the DFS 104, and for all other pages, until all pages in the "layout pages" field have been formatted.

Figure 5:
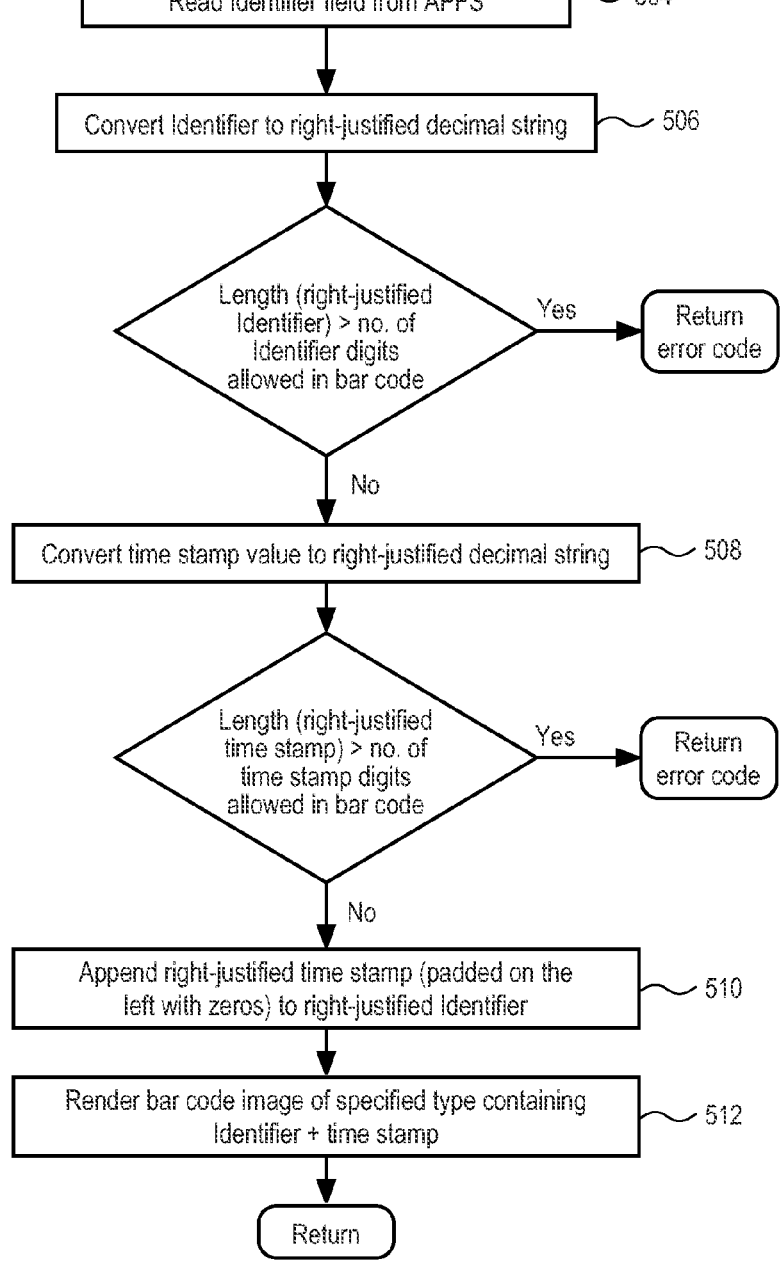
FIG. 5 is a flowchart of a method of generating barcodes for a multimedia representation.

Referring now to FIG. 5, there is shown a flowchart describing generation of barcodes for multimedia documents 120. The APPS 108 is coupled to a control program that runs the subroutine process, as described below. In this embodiment, the processing steps include inputting 502 information, including barcode type (e.g., interleaved 2 of 5), number of identifier digits in barcode, number of time stamp digits in a barcode, and time stamp value. The system then reads 504 the identifier field from the formatting module 204, and then converts 506 the identifier into a right-justified decimal string. The system then determines if the length of the right-justified identifier is greater than the number of identifier digits allowed in the barcode. If so, then the system returns an error code to the control program. If not, then the system converts 508 the time stamp value into a right-justified decimal string. The system then determines if the length of the right-justified time stamp is greater than the number of time stamp digits allowed in the barcode. If so, then the system returns an error code. If not, then the system appends 510 the right-justified time stamp, which is padded on the left with zeros, to the right-justified identifier. The system then renders 512 a barcode image of the specified type, containing identifier information plus time stamp information. The system sends a return message to the control program signaling the end of the operation.

Though the above-described flowcharts are discussed in reference to audio content, these methods can also apply to video or other media content. The figures that follow show examples of the results of applying different combinations of format specification, feature extraction, and parameters for the audio paper generation algorithm. As stated previously, the format specifications, feature extraction and parameters can also be used to generate a document displaying another type of media content.

FIG. 6 shows a graphical representation of audio paper with regularly spaced user-selectable identifiers 116 and the associated DFS 104 with audio feature extraction specification 602 for creating the audio paper. In FIG. 6a, there is shown a DFS 104 for specifying the layout and content for generating an audio paper document 120. It includes various DFS 104 fields, in which information regarding layout and content is specified. In this example, there is a "type" field 604, listing the type of audio content included in the document 120 (e.g., a musical recording). The "identifier" field 608 lists identifying information that is to be included in the barcode or user-selectable identifier 116. The "title" field 610 lists the title of the musical recording (e.g., Locomotion). The "artist" field 612 lists the name of the artist who created the audio content (e.g., John Coltrane). The DFS 104 includes a "collection" field 614, specifying the music collection or album in which the recording is included (e.g., Blue Train). The DFS 104 also includes a "publisher" field 616 and "publication date" field 618 that specify who published the recording and on what date (e.g., Blue Note Records, in 1957). The "begin time" field 620 and the "end time" field 622 list the time at which the audio content begins (e.g., "00:00:00") and the time at which the content ends (e.g., "00:07:14"). The "graphical representation" field 624 describes the type of graphical representation of audio content that will be included in the document 120 (e.g., an amplitude curve).

The DFS 104 also includes information about user-selectable identifiers 116, or markers, to be included in the document 120, along with the layout specifics of the document 120. There is shown a "marker type" field 628 and a "marker frequency" field 630, which specify the type of marker to be included in the document 120 (e.g., a barcode), and the frequency at which the marker should appear in along the graphical representation (e.g., at 30 second intervals). Additionally, the layout fields give information about the layout of the document 120. In FIG. 6a, there is shown a "layout type" field 632 that specifies the arrangement of the contents of the audio paper. For example, the layout type can include one horizontal timeline to be displayed on the document 120, or it could instead include two vertical timelines. The "layout pages" field 634 specifies the number of pages of the document 120. The "layout marker placement" field 636 specifies the location at which user-selectable identifiers 116 or markers should be displayed (e.g., above the graphical representation). Additionally, the "layout meta-data placement" field 638 lists information about the placement of meta-data on the document 120. The meta-data can include a header 110 or other meta-data.

The DFS 104 of FIG. 6a displays just one example of a set of information about the media representation being generated. In other embodiments, the DFS 104 can include a number of other fields including, but not limited to, a field for picture information, for hypertext links, for biographies of artists, for birth/death dates of artists, for address information of artists, for information on where to purchase the displayed media content (i.e., link to website for purchasing the album), and the like. Some other examples of DFS 104 fields are also discussed below. This is a non-exhaustive list of variations, and numerous other types of information could be incorporated.

Also shown in FIG. 6a is the audio feature extraction specification 602. The feature field 606 defines the feature extraction applied to the audio content. In this example, the audio feature extraction 602 is an audio amplitude extraction and graphical approximation. Thus, the document 120 shows an audio waveform 112. In this example, an SVG file is output.

In FIG. 6b, there is shown a graphical representation of an audio paper document 120, according to one embodiment of the present invention. In this document 120, there is shown a header 110, with header information according to the specifications in the DFS 104. The header 110 is also positioned as specified in the DFS 104 (i.e., in this case, it is centered at the top of the page). The document 120 displays an audio waveform 112 or amplitude curve along a timeline. In other embodiments of the present invention, the timeline can be represented by a single straight line, or other variations of a graphical representation. The timeline runs from "00:00:00" to "00:07:14," which corresponds to the length of the audio recording. Time stamps 114 are shown at three places along the audio waveform 112, marking the beginning time and ending time of the recording, along with a time stamp 114 marking a location in the middle of the section. The document 120 can show more than three time stamps 114 or no time stamps 114 at all, according to the user's preferences.

In addition, the document 120 displays user-selectable identifiers 116 (e.g., barcodes), which provide an interface by which the user can access the audio content at locations along the timeline. In some embodiments, the user can specify particular locations for each user-selectable identifier 116. In this example, the user has specified that the document 120 should include barcode markers at every 30 seconds along the timeline. These user-selectable identifiers 116 are displayed in a "stair-step" fashion, rather than in one long line, to allow for easier selection of each individual identifier 116. However, the arrangement of user-selectable identifiers 116 can vary greatly, and can be specified in the DFS 104. As described previously, the user can select any user-selectable identifier 116 in the printed document to play the associated audio content. For example, the user could scan a barcode, using a cell phone with a barcode scanner, at any location along the timeline to play the recording starting from that point on the cell phone screen or other display device.

Referring now to FIG. 7, there is shown a graphical representation of a document 120 with user-selectable identifiers 116 for each musical solo in the recording, and the associated DFS 104 with audio feature extraction specification 602 for creating the audio paper 120. The DFS 104 shown in FIG. 7a is similar to that shown in FIG. 6a, but the example of FIG. 7a includes a few variations. The FIG. 7a example of a DFS 104 includes a "feature extraction" field 702 that lists the feature extraction to be applied to the audio content. In this case, the feature extraction includes marking of musical solos within the audio content, in which the output shows the instrument name and the time when the solo began. In the example of FIG. 7a, there is shown a "marker type 1" field 704 and a "marker type 2" field 706, and these fields specify two types of user-selectable identifiers 116 to be displayed in the document 120. For example, the document 120 will include a marker type 1 that displays an instrument name that is shown above a barcode that is shown above a time stamp 114. In the example, a marker type 2 will be a barcode (i.e., a second barcode displayed at defined locations under the graphical representation). The DFS 104 also includes a "layout marker 1 placement" field 710 and a "layout marker 2 placement" field 712. These fields specify where each marker will be shown on the document 120, such as under the timeline or above the timeline.

FIG. 7a also shows an audio feature extraction specification 602 in the "feature" field 606. The audio feature extraction specification 602 in this example includes audio amplitude extraction and graphical approximation, along with an SVG file output. Additionally, the audio feature extraction specification 602 includes a musical solo extraction, which outputs the beginning times of each solo and the instrument used in each solo. In this example, one type of feature extraction is being applied to audio content. However, the system can be configured to apply any number of feature extraction types at a time. Other examples of feature extraction include, but are not limited to, speech detection, speaker detection, speaker recognition, video/audio event detection, video foreground/background segmentation, face detection, face image matching, face recognition, face cataloging, video text localization, optical character recognition (OCR), language translation, frame classification, clip classification, image stitching, audio reformatter, audio waveform matching, audio-caption alignment, video OCR and caption alignment, sound localization, radio transmission recognition, audio/video range selection by a slider, speaker segmentation, profile analysis, color histogram analysis, clustering, motion analysis, distance estimation, scene segmentation, license plate or automobile recognition or motion analysis, and the like. This is a non-exhaustive list of variations, and numerous other types of extraction could be incorporated in the present invention.

FIG. 7b shows a graphical representation of a document 120 according to the DFS 104 and audio feature extraction specification 602 of FIG. 7a. The document 120 includes a header 110, an audio waveform 112 displayed horizontally, and time stamps 114 at locations along the bottom of the audio waveform 112. In this example, there are also user-selectable identifiers 116 included near each timestamp 114. The user can select these user-selectable identifiers (e.g., scan the barcode) to begin playing the audio content at the location of the marker. For example, if the user scans the barcode shown above time "00:00:00," the recording will start playing from the beginning. Since a solo extraction was applied to the audio content displayed in document 120, the audio waveform 112 includes markers for each musical solo. The markers include the text description 714 that explains the type of solo being marked (e.g., a saxophone solo), a user-selectable identifier 116 that provides an interface to the solo, and a time stamp 114 showing the location of the solo within the audio content. For example, by scanning the barcode under the "sax" solo in the printed document, the saxophone solo will start playing from the beginning on a display device.

Referring now to FIG. 8, there is shown a graphical representation of a document 120 showing a timeline for a radio program, and the associated DFS 104 with audio feature extraction specification 602 for creating the audio paper 120. The DFS 104 shown in FIG. 8a is similar to that shown in FIG. 6a, but the example of FIG. 8a includes a few variations. The example of FIG. 8a shows the DFS 104 for a radio program, and the DFS 104 includes an "annotation" field 802 that adds an extra annotation to the document 120 regarding the radio program. In this example, the annotation shows that the guest on the program is "Bill O'Reilly." Thus, a summary of available meta information about a radio talk show, such as the time it occurred, the name of the host, and its duration can printed on paper together with barcodes for each portion of the conversation and indications of when commercial breaks occurred. The names of the participants could be included if they are known. The barcodes could point to audio data recorded separately by the user of the system, or they could point to audio data on a web site provided by the talk show. This could be coupled to software that post-processes the recording, producing the document and the streamable media file as well as a web page. Further utility would be provided by actively linking the production process to annotation performed online while the talk show occurs. This annotation can be performed at the radio station while the show is happening since the producers would have access to information not available to a listener, such as the phone numbers of people calling the program.

FIG. 8b shows a document 120 displayed according to DFS 104 with audio feature extraction specification 602. The document 120 includes a header 110 showing the title, date, and annotation information for the radio program, an audio waveform 112, time stamps 114, and user-selectable identifiers 116 displayed in a "3-step staircase" fashion.

Referring now to FIG. 9, there is shown a graphical representation of a document 120 showing a timeline for a radio program with markers for keywords, and the associated DFS 104 with audio feature extraction specification 602 for creating the audio paper 120. The DFS 104 shown in FIG. 9a is similar to that shown in FIG. 8a, but the example of FIG. 9a a includes variations on the marker information. The "marker type" field 628 of FIG. 9a shows a marker type that includes keywords, barcodes, and timestamps. The "marker frequency" field 630 shows that the frequency is "user-defined." Thus, in this example, the user has selected each marker to be displayed along the timeline. In the "marker" fields 902, the user has made selections for markers 1 through 11. For marker 1, for example, the user has defined the marker to include a barcode, a timestamp, and text describing the marker (e.g., "WTC"), and likely describing the audio content that is being marked. The user has also defined the vertical position of each marker, as "vert. pos. 1," "vert. pos. 2," or "vert. pos. 3," along the timeline. These positioning specifications determine where the marker will be positioned vertically, chosen from a number of stair-step positions above the timeline. The audio feature extraction 602 is again an audio amplitude extraction with graphical approximation.

FIG. 9b shows document 120 displayed according to the DFS 104 and audio feature extraction specification 602 of FIG. 9a. The document 120 includes a header 110 for the radio program, an audio waveform 112, time stamps 114 under the audio waveform 112, and markers displayed at user-defined positions along the timeline. The markers include text information 714 set by the user to describe the content in the radio program that is being marked. Additionally, the markers include a user-selectable identifier 116 and a timestamp 114.

Referring now to FIG. 10, there is shown a graphical representation of a document 120 showing a timeline for a radio program with audio feature extraction for search terms. The DFS 104 of FIG. 10a shows, in the "feature extraction" field 702 that speech recognition and keyword match techniques were applied to the audio content. In this example, the user searched for "New York Times" or "fair and balanced" as search terms. FIG. 10a shows the "marker type" field 628 that includes a matching search term, barcodes, and timestamps. The "marker frequency" field 630 shows that the frequency is "user-defined." Thus, in this example, the user has selected each marker to be displayed along the timeline. In the "marker" fields 902, the user has made selections for markers 1 through 11. For marker 1, for example, the user has defined the marker to include a barcode, a timestamp, and text describing the marker (e.g., "fair and balanced"), and the vertical position of each marker.

The audio feature extraction specification 602 again includes an audio amplitude extraction with graphical approximation. The audio feature extraction specification 602 also includes speech recognition, along with term matching to a given list of keywords. Thus, the user searched for locations within a radio program in which the speakers use particular terms, and these locations are marked along the timeline, possibly along with a transcript of a portion of or all of the speech. As an alternative, the user could apply speech recognition alone, recognizing any point in the audio content in which speech occurred. Since the speech recognition output may be noisy, some representation for the confidence of the recognition can also be included, so the user can see which words or phrases are more likely to be correct. For example, the document 120 could include colors or variations in font size to represent recognition confidence. The highest confidence decisions could be shown in red, 12-point font, while the lowest confidence decisions could be in blue, 8-point font. User-selectable identifiers 116 can be included for each decision or for only the ones with the highest confidence.

Other examples of audio feature extractions that could be applied to audio content include speaker detection and speaker recognition. The speaker detection extraction can recognize a group of equivalent speakers in a recording and determine when the same person was speaking. This can be represented along a timeline by segments annotated with a limited palette of colors, showing a different color for each speaker, and the same color for the same speaker. This might be used for scanning through a long recording looking for only the comments of a specific person. Speaker recognition extraction identifies the actual people who spoke during an audio recording. The symbolic identity of the people can be computed and added next to segments of the timeline together with barcodes that when swiped would play the audio from the beginning of that segment. This would allow one to scan the printout and see who participated in a meeting. An alternative version could print a list of names and could place bar codes next to those names. A user could swipe those barcodes and listen to the parts of the recording when that person spoke. A further example would retrieve face images for those people and print them next to the names and barcodes. The audio data could also be embedded in a two-dimensional bar code, thus providing a completely stand-alone representation for the audio file.

FIG. 10b shows document 120 displayed according to the DFS 104 with audio feature extraction specification 602 of FIG. 10a. The document 120 includes a header 110 for the radio program that also shows an annotation of "keyword search terms," an audio waveform 112, time stamps 114 under the audio waveform 112, and markers displayed at user-defined positions along the timeline. The markers include text information 714 set by the user to describe the content in the radio program that is being marked. In this case, the text information 714 is the specific term that was found in the audio content. Additionally, the markers include a user-selectable identifier 116 and a timestamp 114. By selecting the user-selectable identifier 116, the user can hear the audio content in which the search term was used.

In FIG. 11, there is shown a graphical representation of a document 120 showing a timeline for a radio program with audio feature extraction for applause events. The DFS 104 of FIG. 11a shows, in the "feature extraction" field 702 that applause detection was applied to the audio content. The audio feature extraction specification 602 includes applause detection timestamps. Thus, the user searched for locations within a radio program that applause events occurred, and these locations are marked along the timeline.

FIG. 11b shows document 120 displayed according to the DFS 104 and audio feature extraction specification 602 of FIG. 11a. The document 120 includes a header 110 for the radio program that also shows an annotation of "applause events shown," an audio waveform 112, time stamps 114 under the audio waveform 112, and markers displayed at user-defined positions along the timeline. As an alternative, the system could mark when other events occurred in the audio content, such as laughter, loud conversations, doors slamming, etc. This could be used to quickly scan a recording of a meeting, for example, for points at which arguments occurred in the meeting. The markers include a user-selectable identifier 116 and a timestamp 114. By selecting the user-selectable identifier 116, the user can hear the audio content in which the applause occurred. The user-selectable identifier can refer to audio data stored off-line or to audio embedded in two-dimensional identifiers (e.g., barcodes) printed on the paper document.

Sound localization techniques could also be applied to audio content. In this example, a timeline representation can include directional indicators that point to places in a room where the recording was done. This allows users to quickly scan the timeline and determine when, for example, the person in the southeast corner of the room or the person across the table from them, was speaking. This can be applied, for example, with fixed installations that have multiple-microphone setups that can be calibrated to perform sound localization. It can also be used with appropriately equipped portable recorders, such as those used by professionals who record interviews.

In FIG. 12, there is shown a graphical representation of a document 120 showing a timeline for a radio program with audio feature extraction for music events. The DFS 104 of FIG. 12a shows, in the "feature extraction" field 702 that music detection was applied to the audio content. The audio feature extraction specification 602 includes music detection timestamps. Thus, the user searched for locations within a radio program that music events occurred, and these locations are marked along the timeline. Additionally, the "layout type" field 632 shows the layout type to include two vertical timelines that are split in half.

FIG. 12b shows document 120 displayed according to the DFS 104 and audio feature extraction specification 602 of FIG. 12a. The document 120 includes a header 110 for the radio program that also shows an annotation of "music events shown," an audio waveform 112, time stamps 114 near the audio waveform 112, and markers displayed at user-defined positions along the timeline. The markers include a user-selectable identifier 116 and a timestamp 114. By selecting the user-selectable identifier 116, the user can hear the audio content in which the applause occurred. The timelines are displayed according to the layout type shown in the DFS 104, with the timeline split into two halves, and each half displayed vertically.

Multimedia paper can also be used for generating representations of voice mail messages. A user can generate a summary of the available meta information about a collection of voice mail messages, such as the phone number of the calling party, the result of looking up that phone number in an internet search engine (which can often show the name of the caller, their address, and a map showing their location), as well as the date, time, and duration of messages. Each block of meta information could be printed next to a barcode that would retrieve the audio information from a remote network location or it could be represented in a two-dimensional barcode that could be played directly from the paper, thus obviating the need for any off-device access. The paper document provides value to users by providing extra information that can be retrieved and added to the paper document (e.g., internet search engine information). Also, the paper document itself would provide users with the ability to write notes about the voice mail messages on the document.

Multimedia paper can also be used in generating representations of public safety radio transmissions. A summary of the available meta information about the recording of one or more public safety (e.g., police, fire, etc.) radio transmissions, including the date, time, duration, car number, officer name (if available), can be printed on paper together with barcodes that reference an off-line representation for those recordings. Two-dimensional bar codes can also be used that directly encode audio data. This provides a stand-alone representation that can be used independently of a network connection. The meta information can be computed by signal processing algorithms applied to the recorded audio, or it could be computed from digital side channel information provided in the radio transmissions (e.g., Motorola digital radio information). Alternatively, it could be provided digitally at the radio dispatcher's console. This system could assist managers who need to selectively inspect the radio logs, or it could assist members of the public who want to observe public safety procedures.

Multimedia paper can also be used in generating representations of aviation radio transmissions. A summary of the available meta information about the recording of one or more aviation radio transmissions, including the date, time, duration, flight name, origin, destination, current position, of a flight when a particular transmission occurred, can be printed on paper together with barcodes that point to an online form of the audio recording. The meta information can be extracted directly from the mode S transponder returns, assuming suitable equipment is available. Additional meta information could be retrieved from various online services that track flight progress in real-time. Speech recognition applied to the audio recording could provide symbolic information that could be used to compute links to the online data. This would obviate the need for a direct link to the mode S data and would make this system usable by people without access to FAA equipment.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A computer system for generating a representation of time-based media, the system comprising:
    a feature extraction module for:
        extracting, using a feature extraction technique, features from the time-based media, the feature extraction technique specified by a document format specification file; and
        generating a media representation of the time-based media that represents the extracted features, the media representation including a waveform representing the time based media including the extracted features, a corresponding timeline and a plurality of user-selectable identifiers indicating locations on the timeline corresponding to the extracted features;
    a formatting module communicatively coupled to the feature extraction module, the formatting module for:
        formatting the media representation according to layout parameters specified by the document format specification file; and
    a printer communicatively coupled to the formatting module, the printer for:
        printing the formatted media representation, wherein each of the plurality of user-selectable identifiers in the printed, formatted media representation can be selected to access a corresponding part of the time-based media.

2. The system of claim 1, wherein the feature extraction module further comprises content recognition software for recognizing features in the time-based media.

3. The system of claim 1, further comprising processing logic for controlling a printer driver interface associated with the printer.

4. The system of claim 1, further comprising processing logic for controlling a printer console on the printer.

5. The system of claim 1, wherein the feature extraction module is further adapted to generate the media representation in digital format.

6. The system of claim 1, wherein the feature extraction module is further adapted to generate the media representation in paper format.

7. The system of claim 1, wherein at least one of the user-selectable identifiers comprises a barcode printed on a document displaying the formatted media representation.

8. The system of claim 7, wherein the barcode on the document can be scanned to play time-based media associated with the extracted features on a display device.

9. The system of claim 1, wherein the waveform represents audio content.

10. The system of claim 1, wherein the timeline includes markers along its length that correspond to user-selected segments of the time-based media.

11. The system of claim 1, wherein the timeline includes markers along its length that correspond to segments of audio content, the segments being defined by a search for particular features within the time-based media.

12. The system of claim 1, wherein the timeline includes markers along its length that correspond to segments of media content, at least one of the markers having text information describing a corresponding segment of media content.

13. The system of claim 1, wherein the timeline includes markers along its length that each correspond to a segment of the time-based media, at least one of the markers having timestamp information describing the corresponding segment of the time-based media.

14. The system of claim 1, wherein the media representation includes a header describing the time-based media.

15. The system of claim 1, wherein the formatting module is further adapted to format the media representation according to format specifications included in the document format specification file.

16. The system of claim 15, wherein the format specifications included in the document format specification comprise a number of user-definable fields specifying a format of the media representation of the time-based media.

17. The system of claim 15, wherein the format specifications included in the document format specification comprise a number of user-definable fields specifying a layout of the media representation.

18. The system of claim 15, wherein the format specifications included in the document format specification comprise a number of user-definable fields specifying media content markers included in the media representation.

19. The system of claim 1, wherein the document format specification comprises a number of user-definable fields specifying feature extraction techniques to apply to the time-based media.

20. A method for generating a representation of time-based media, the method comprising:
- extracting, using a feature extraction technique, features from the time-based media, the feature extraction technique specified by a document format specification file;
- generating a media representation of the time-based media that represents the extracted features, the media representation including a waveform representing the time based media including the extracted features, a corresponding timeline and a plurality of user-selectable identifiers indicating locations on the timeline corresponding to the extracted features;
- formatting the media representation according to layout parameters specified by the document format specification file; and
- printing the formatted media representation, wherein each of the plurality of user-selectable identifiers in the printed, formatted media representation can be selected to access a corresponding part of the time-based media.

21. The method of claim 20, wherein extracting features from the time-based media further comprises performing keyword searching on the time-based media.

22. The method of claim 20, wherein extracting features from the time-based media further comprises performing speech recognition on the time-based media.

23. The method of claim 20, wherein extracting features from the time-based media further comprises performing event detection on the time-based media.

24. The method of claim 20, wherein the waveform represents audio content.

25. The method of claim 20, wherein at least one of the user-selectable identifiers comprises a barcode printed on a document displaying the formatted media representation.

26. The method of claim 25, wherein the barcode on the document can be scanned to play time-based media associated with the extracted features on a display device.

27. The method of claim 25, further comprising applying a barcode generation algorithm to render a barcode image including identifier information.

28. The method of claim 25, further comprising applying a barcode generation algorithm to render a barcode image including timestamp information.

29. The method of claim 20, further comprising generating markers along the timeline, the markers corresponding to user-selected segments of the time-based media.

30. The method of claim 20, further comprising generating markers along the timeline, at least one of the markers corresponding to features extracted from the time-based media.

31. The method of claim 20, further comprising generating markers along the timeline, at least one of the markers including text information describing the time-based media.

32. The method of claim 20, further comprising generating markers along the timeline, at least one of the markers including timestamp information describing the time-based media.

33. The method of claim 20, wherein printing the formatted media representation further comprises printing a header describing the time-based media.

34. The method of claim 20, wherein printing the formatted media representation further comprises generating a representation in digital format.

35. The method of claim 20, wherein printing the formatted media representation further comprises printing a representation in paper format.

\* \* \* \* \*